US012442024B2

(12) United States Patent
Sato et al.

(10) Patent No.: US 12,442,024 B2
(45) Date of Patent: Oct. 14, 2025

(54) DIHOMO-GAMMA-LINOLENIC ACID-CONTAINING MICROBIAL OIL/LIPID WITH REDUCED ARACHIDONIC ACID CONTENT

(71) Applicant: Nippon Suisan Kaisha, Ltd., Tokyo (JP)

(72) Inventors: Seizo Sato, Tokyo (JP); Takayoshi Sekiguchi, Tokyo (JP); Misaki Takahashi, Tokyo (JP)

(73) Assignee: Nippon Suisan Kaisha, Ltd., Tokyo (JP)

( * ) Notice: Subject to any disclaimer, the term of this patent is extended or adjusted under 35 U.S.C. 154(b) by 951 days.

(21) Appl. No.: 17/359,948

(22) Filed: Jun. 28, 2021

(65) Prior Publication Data

US 2021/0324433 A1    Oct. 21, 2021

Related U.S. Application Data

(63) Continuation-in-part of application No. PCT/JP2019/051565, filed on Dec. 27, 2019.

(30) Foreign Application Priority Data

Dec. 28, 2018  (JP) .................................. 2018-248464

(51) Int. Cl.
*C12P 7/6418* (2022.01)
*A61K 31/202* (2006.01)
*A61K 45/06* (2006.01)
*C12N 1/14* (2006.01)
*C12N 9/02* (2006.01)
*C12R 1/645* (2006.01)

(52) U.S. Cl.
CPC .......... *C12P 7/6418* (2013.01); *A61K 31/202* (2013.01); *A61K 45/06* (2013.01); *C12N 1/145* (2021.05); *C12N 9/0071* (2013.01); *C12R 2001/645* (2021.05); *C12Y 114/19003* (2013.01)

(58) Field of Classification Search
CPC .... C12P 7/6418; C12P 7/6427; A61K 31/202; A61K 45/06; A61K 2800/10; A61K 8/361; A61K 2800/86; A61K 8/37; A61K 8/92; A61K 8/99; A61K 31/20; A61K 31/201; A61K 31/232; A61K 35/66; A61K 36/06; C12N 1/145; C12N 9/0071; C12R 2001/645; C12Y 114/19003; A23D 9/00; A23V 2250/1874; A23V 2300/14; C11B 1/10; A61P 29/00; A61P 31/02; A61P 37/08; A61Q 19/00; C11C 3/003
See application file for complete search history.

(56) References Cited

U.S. PATENT DOCUMENTS

| | | | | |
|---|---|---|---|---|
| 4,782,025 A | * | 11/1988 | Inoue ..................... | C12P 19/12 |
| | | | | 435/100 |
| 6,280,982 B1 | | 8/2001 | Kawashima et al. | |
| 6,805,859 B2 | * | 10/2004 | Imada ................... | C12N 1/145 |
| | | | | 504/117 |
| 7,094,592 B2 | * | 8/2006 | Watanabe ............... | C12N 1/20 |
| | | | | 435/243 |
| 9,820,484 B2 | * | 11/2017 | Sato ....................... | C11B 3/12 |
| 11,491,118 B2 | * | 11/2022 | Hetherington ....... | A61K 31/196 |
| 2008/0020124 A1 | | 1/2008 | Kawashima et al. | |
| 2008/0108699 A1 | | 5/2008 | Tateishi et al. | |
| 2010/0167359 A1 | | 7/2010 | Katano et al. | |
| 2016/0317592 A1 | | 11/2016 | Yamaguchi et al. | |

FOREIGN PATENT DOCUMENTS

| | | |
|---|---|---|
| JP | H05-91887 A | 4/1993 |
| JP | 2017-502114 A | 1/2017 |
| WO | WO-2005/083101 A1 | 9/2005 |
| WO | WO-2006/085687 A1 | 8/2006 |
| WO | WO-2008/087921 A1 | 7/2008 |
| WO | WO-2009/022323 A1 | 2/2009 |
| WO | WO-2011/154947 A2 | 12/2011 |
| WO | WO-2015/083806 A1 | 6/2015 |
| WO | WO-2015/083843 A2 | 6/2015 |

OTHER PUBLICATIONS

Extended European Search Report issued Aug. 31, 2022 in European Patent Application No. 19903896.9.
"Product specification sheet cis-8, 11,14-Eicosatrienoic acid=99%", Retrieved from the Internet: URL:https://www.sigmaaldrich.com/specification-sheets/395/818/E4504-BULK SIGMA .pdf [retrieved on Aug. 17, 2022].
"Product specification sheet cis-, 11, 14-Eicosatrienoic acid methyl ester=99%", Retrieved from the Internet: URL:https://www.sigmaaldrich.com/specification-sheets/1 15/574/E351 1-BULKSIGMA _.pdf [retrieved on Aug. 17, 2022].
Abe et al., "Identification of Mutation Sites on Δ5 Desaturase Genes from *Mortierella alpina* 1S-4 Mutants," Journal of Bioscience and Bioengineering 2005, vol. 99, No. 3, pp. 296-299.
Jareonkitmongkol et al., "Fatty acid desaturation-defective mutants of an arachidonic-acid-producing fungus, *Mortierella alpina* 1S-4," Journal of General Microbiology 1992, vol. 138, pp. 997-1002.
Kawashima et al., "Industrial Production of Dihomo-γ-linolenic Acid by a Δ5 Desaturase-defective Mutant of *Mortierella alpina* 1S-4 Fungus," Journal of the American Oil Chemists' Society 2000, vol. 77, No. 11, pp. 1135-1138.
Jareonkitmongkol et al., "A Novel Δ5-Desaturase-Defective Mutant of *Mortierella alpina* 1S-4 and Its Dihomo-γ-Linolenic Acid Productivity," Applied and Environmental Microbiology, Dec. 1993, vol. 59, No. 12, pp. 4300-4304.

(Continued)

*Primary Examiner* — Aaron J Kosar
(74) *Attorney, Agent, or Firm* — Banner & Witcoff, Ltd.

(57) ABSTRACT

The purpose of the present invention is to provide an oil/lipid that contains dihomo-γ-linolenic acid at a higher purity. Provided is a microbial oil/lipid that is specified by a high content of dihomo-γ-linolenic acid contained therein and/or a reduced content of undesirable constituting fatty acid(s).

38 Claims, 1 Drawing Sheet

Specification includes a Sequence Listing.

(56) References Cited

OTHER PUBLICATIONS

Kikukawa et al., "Microbial production of dihomo-γ-linolenic acid by Δ5-desaturase gene-disruptants of *Mortierella alpina* 1S-4," Journal of Bioscience and Bioengineering 2016, vol. 122, No. 1, pp. 22-26.
International Search Report mailed Apr. 7, 2020 in PCT/JP2019/051565.

* cited by examiner

DIHOMO-GAMMA-LINOLENIC ACID-CONTAINING MICROBIAL OIL/LIPID WITH REDUCED ARACHIDONIC ACID CONTENT

REFERENCE TO RELATED APPLICATIONS

This application is a Continuation-In-Part Application of International Application No. PCT/JP2019/051565, filed Dec. 27, 2019, and claims benefit of Japanese Patent Application No. 2018-248464, filed Dec. 28, 2018, the entire contents of which are incorporated by reference herein.

SEQUENCE LISTING

The instant application contains a sequence listing which has been submitted in ASCII format via EFS-Web and is hereby incorporated by reference in its entirety. Said ASCII copy, created on Nov. 5, 2019 is named P190613WO_Sequence_Listing.txt and is 13,507 bytes in size.

TECHNICAL FIELD

The present disclosure relates to a dihomo-γ-linolenic acid (also referred to hereinafter as DGLA) —containing microbial oil/lipid, a lower alcohol ester composition or free fatty acid composition obtained from the microbial oil/lipid, a dihomo-γ-linolenic acid-containing microbial biomass, their use, a method of their production, and a microorganism which is used in their production.

BACKGROUND ART

DGLA (C20:3, n-6) (8, 11, 14-eicosatrienoic acid) is one of the constituent fatty acids in fish oils, marine algae and the like. DGLA is known to be produced as a precursor for arachidonic acid (C20:4, n-6) (5, 8, 11, 14-eicosatetraenoic acid) (also referred to hereinafter as ARA) in microorganisms such as *Mortierella alpina*. However, there is only a slight amount of generation of DGLA in microorganisms including fatty components such as triglycerides, diglycerides, monoglycerides, phospholipids, and sterols. DGLA and ARA are fatty acids that have similar chemical characteristics. Thus, separation of DGLA from ARA is difficult.

Technology has been proposed for decreasing the amount of ARA generated in the microorganism in order to produce DGLA in an efficient manner (Non-Patent Documents 1 to 5, Patent Documents 1 to 3). For example, JP H5-091887 A discloses a method of producing DGLA or a lipid containing DGLA, the method including culturing a microorganism having an ability to produce ARA but having a reduced or lost Δ5 desaturase activity, to produce DGLA or DGLA-containing lipids, and recovering the DGLA or DGLA-containing lipids. Moreover, Patent Document 1 also discloses that the microorganism, which has the ability to produce ARA and has reduced or lost Δ5 desaturation activity, can be obtained by culturing in the presence of a Δ5 desaturase inhibitor, e.g. sesamin or the like. Patent Document 2 discloses that a microbial oil/lipid having a high DGLA/ARA ratio can be produced by using a combination of two or more Δ5 desaturase inhibitors. Non-Patent Documents 1 to 5 disclose the formation of DGLA-containing oil by introducing a mutation in a gene encoding a Δ5 desaturase or disrupting the gene in the *Mortierella alpina* 1S-4 strain. In some strains having the disrupted Δ5 desaturase gene as described in Non-Patent Document 5, ARA below a detection limit is achieved. However, Table 3 of Non-Patent Document 5 only shows results up to the first decimal place.

Patent Document 3 discloses a method of producing phospholipids including, as constituents, long-chain polyunsaturated fatty acids such as ARA and DGLA.

Despite these prior disclosures, commercial production of microbial oil/lipid with an increased content of DGLA has scarcely taken place up to now, because of the technical difficulties in achieving a product of satisfactory and useful quality.

CITATION LIST

Patent Literature

Patent Document 1: JP H5-091887 A
Patent Document 2: JP 2017-502114 T
Patent Document 3: WO 2005/083101

Non-Patent Document

Non-Patent Document 1: Abe et al., J. Biosci. Bioeng. (2005) vol. 99, No. 3, pp. 296-299
Non-Patent Document 2: Jareonkitmongkol et al., J. General Microbiology (1992) vol. 138, pp. 997-1002
Non-Patent Document 3: Kawashima et al., JAOCS (2000) vol. 77, No. 11, pp. 1135-1138
Non-Patent Document 4: Jareonkitmongkol et al., Appl. Environ. Microbiol. (1993) vol. 59, No. 12, pp. 4300-4304
Non-Patent Document 5: Kikukawa et al., J. Biosci. Bioeng. (2016) vol. 122, No. 1, pp. 22-26

SUMMARY OF INVENTION

Technical Problem

An objective of the present disclosure is to provide a microbial oil/lipid and a microbial biomass for use in obtaining a dihomo-γ-linolenic acid-containing oil that is higher in purity than a microbial oil/lipid obtained by the known methods, and also provides a method of producing a microbial oil/lipid using a microbial biomass.

Solution to Problem

The present disclosure relates to a microbial oil/lipid comprising dihomo-γ-linolenic acid (DGLA) with high purity as a constituent fatty acid of an oil. The microbial oil/lipid of the present disclosure is characterized by inclusion of DGLA and/or reduction of undesirable constituent fatty acid. Constituent fatty acids that are not desired in the microbial oil/lipid of the present disclosure include arachidonic acid (ARA) and/or long-chain saturated fatty acid.

More specifically, the microbial oil/lipid of the present disclosure is characterized by a content of DGLA and a content of ARA. In this case, the microbial oil/lipid may be further characterized by a content of the long-chain saturated fatty acid.

In another aspect, the microbial oil/lipid of the present disclosure is characterized by the content of DGLA and the content of the long-chain saturated fatty acid. In this case, the microbial oil/lipid may be further characterized by the content of ARA.

In another aspect, the microbial oil/lipid of the present disclosure includes DGLA and is characterized by the content of the long-chain saturated fatty acid and the content of ARA. In this case, the microbial oil/lipid may be further characterized by the content of DGLA.

In another aspect, the microbial oil/lipid of the present disclosure includes DGLA and may be characterized by a compositional ratio of the long-chain saturated fatty acid(s) to DGLA. In this case, the microbial oil/lipid may be further characterized by the content of ARA, and may be furthermore characterized by the content of DGLA.

In another aspect, the microbial oil/lipid of the present disclosure includes DGLA and may be characterized by a compositional ratio of ARA to DGLA. In this case, the microbial oil/lipid may be further characterized by the compositional ratio of the long-chain saturated fatty acid to DGLA, may be further characterized by the content of ARA, and may be furthermore characterized by the content of DGLA.

According to one aspect of the present disclosure, the long-chain saturated fatty acid is C24:0, C22:0, and C20:0, and the content and the compositional ratio are calculated based on a total amount. According to another aspect, the long-chain saturated fatty acid is C24:0 and C22:0, and the content and the compositional ratio are calculated based on the total amount. According to yet another aspect, the long-chain saturated fatty acid is C24:0, and the content and compositional ratio of C24:0 may be calculated.

DGLA contained in the microbial oil/lipid of the present disclosure may be contained in the microbial oil/lipid at a content of greater than 30 wt. %, greater than 31 wt. %, greater than 32 wt. %, or greater than 34 wt. % as the constituent fatty acid of the oil.

In the microbial oil/lipid of the present disclosure, the content of ARA is reduced, or ARA is substantially not present. In one aspect, in the microbial oil/lipid of the present disclosure, ARA is 0.3 wt. % or less, 0.2 wt. % or less, 0.1 wt. % or less, 0.05 wt. % or less, 0.04 wt. % or less, 0.03 wt. % or less, or 0.01 wt. % or less of the constituent fatty acid of the microbial oil/lipid. In another aspect, in the microbial oil/lipid of the present disclosure, the compositional ratio of ARA to DGLA may be 1/120 or less, 1/180 or less, 1/360 or less, 1/1000 or less, 1/2350 or less, or 1/3000 or less in terms of weight ratio.

The long-chain saturated fatty acid refers to saturated fatty acid having at least 20 carbon atoms and refers to, for example, at least one fatty acid selected from the group consisting of arachidic acid (C20:0), behenic acid (C22:0), and lignoceric acid (C24:0). One aspect of the present disclosure relates to a microbial oil/lipid having a reduced content of long-chain saturated fatty acids.

When C24:0 is the representative long-chain saturated fatty acid, the microbial oil/lipid can be characterized by the content of C24:0 or the compositional ratio of C24:0 to DGLA. In one aspect, the microbial oil/lipid of the present disclosure relates to a microbial oil/lipid in which the content of C24:0 is 8.5 wt. % or less, 7.0 wt. % or less, 6.0 wt. % or less, 5.5 wt. % or less, 5.0 wt. % or less, or 4.5 wt. % or less. In another aspect, the microbial oil/lipid of the present disclosure relates to a microbial oil/lipid in which the compositional ratio of C24:0 to DGLA is 1/4.1 or less, 1/4.5 or less, 1/5.0 or less, 1/6.0 or less, 11.0 or less, or 11.5 or less.

When C24:0 and C22:0 are the representative long-chain saturated fatty acids, the microbial oil/lipid can be characterized by a total content of C24:0 and C22:0 or a total compositional ratio of C24:0 and C22:0 to DGLA. In one aspect, the microbial oil/lipid of the present disclosure relates to a microbial oil/lipid in which the total content of C24:0 and C22:0 is 11.0 wt. % or less, 10.0 wL % or less, 9.0 wt. % or less, 8.0 wL % or less, 7.5 wt. % or less, 7.0 wt. % or less, or 6.5 wt. % or less. In another aspect, the microbial oil/lipid of the present disclosure relates to a microbial oil/lipid that can be characterized by the total compositional ratio of C24:0 and C22:0 to DGLA and in which the compositional ratio is 1/3.1 or less, 1/4.0 or less, 1/4.5 or less, or 1/5.0 or less.

When C24:0, C22:0, and C20:0 are the representative long-chain saturated fatty acids, the microbial oil/lipid can be characterized by a content of a total amount of C24:0, C22:0, and C20:0 or the compositional ratio of the total amount of C24:0, C22:0, and C20:0 to DGLA. In one aspect, the microbial oil/lipid of the present disclosure relates to a microbial oil/lipid whose content is 12.0 wt. % or less, 10.0 wt. % or less, 9.0 wt. % or less, 8.0 wL % or less, or 7.5 wt. % or less. In another aspect, the microbial oil/lipid of the present disclosure relates to a microbial oil/lipid that can be characterized by a total compositional ratio of C24:0, C22:0, and C20:0 to DGLA and in which the compositional ratio is 1/3.0 or less, 1/3.5 or less, 1/4.0 or less, or 1/4.5 or less.

The microbial oil/lipid of the present disclosure may be a crude oil or a refined oil. In one aspect, the microbial oil/lipid of the present disclosure contains no Δ5 desaturase inhibitor.

A further aspect relates to a lower alcohol ester composition derived from the microbial oil/lipid of the present disclosure and containing a dihomo-γ-linolenic acid ester; or a free fatty acid composition derived from the microbial oil/lipid of the present disclosure and containing DGLA. The lower alcohol ester composition or the free fatty acid composition containing dihomo-γ-linolenic acid, obtained or obtainable from the microbial oil/lipid of the present disclosure, has the same or similar content and compositional ratio as those in the original microbial oil/lipid of the present disclosure for the contents and compositional ratios of DGLA, arachidonic acid, and long-chain unsaturated fatty acid.

A microorganism used in the present disclosure is a filamentous fungus, for example, a filamentous fungus of the genus *Mortierella*, for example, *Mortierella alpina* or related species. The microorganism used in the present disclosure may be one having a mutation introduced into a gene encoding a 45 desaturase (DELTA-5 DESATURASE: also referred to hereinafter as D5DS). In one aspect, the microorganism used in the present disclosure is a microorganism having the accession number NITE BP-02778 (NSM243-16 strain).

A further aspect of the present disclosure may relate to a culture of a microorganism used to produce the microbial oil/lipid of the present disclosure. The culture of the microorganism can include a microbial biomass and a culture medium thereof. The microbial biomass including the microbial oil/lipid of the present disclosure and the culture including the microbial biomass of the present disclosure have the same or similar content and compositional ratio as those in the microbial oil/lipid of the present disclosure for the contents and compositional ratios of DGLA, arachidonic acid, and long-chain unsaturated fatty acid.

The microbial oil/lipid, the lower alcohol ester composition, the free fatty acid composition, or the culture according to the present disclosure may be incorporated into medicaments, cosmetics, foodstuffs, supplements or animal feed, more specifically as anti-allergic agents or anti-inflammatory agents. Accordingly, the present disclosure also relates to a pharmaceutical composition, a cosmetic composition, an anti-allergic agent, or an anti-inflammatory agent containing the microbial oil/lipid, the lower alcohol ester composition, the free fatty acid composition, or the culture according to the present disclosure.

A further aspect of the present disclosure relates to a method of producing a microbial oil/lipid. Specifically, the production method includes a step of culturing the microorganism referred to in the present disclosure in a culture medium. As the microorganism used in the production method of the present disclosure, a microorganism strain having a mutation in a Δ5 desaturase gene can be used. The mutation introduced into the Δ5 desaturase gene includes gene mutations that result in a mutation of tyrosine (Y) at position 310 of SEQ ID NO: 3 to cysteine (C) (hereinafter designated as Y310C). Additionally or independently, the gene may be mutated so as to delete bases at positions from 2206 to 2234 of SEQ ID NO: 1. In one aspect, in the method of producing a microbial oil/lipid of the present disclosure, no Δ5 desaturase inhibitor is added to the culture medium in which the microorganism referred to in the present disclosure is cultured. Thus, the culture, the microbial oil/lipid, and/or the microbial biomass obtained by culturing do not contain a residual amount of Δ5 desaturase inhibitor, which may be present when the Δ5 desaturase inhibitor is added.

A further method aspect relates to a method of producing the lower alcohol ester composition or the free fatty acid composition of the present disclosure from the microbial oil/lipid of the present disclosure.

More specifically, the present disclosure may relate to the following invention:

[1] A microbial oil/lipid comprising dihomo-γ-linolenic acid as a constituent fatty acid of the oil in a content of greater than 30 wt. %, greater than 32 wt. %, or more than 34 wt. % and comprising substantially no arachidonic acid or comprising arachidonic acid in a content of 0.3 wt. % or less, 0.2 wt. % or less, 0.1 wt. % or less, 0.05 wt. % or less, 0.04 wt. % or less, 0.03 wt. % or less, or 0.01 wt. % or less.

[2] The microbial oil/lipid described in item 1, wherein as the constituent fatty acid of the oil, a content of C24:0 is 8.5 wt. % or less, 7.0 wt. % or less, 6.0 wt. % or less, or 5.5 wt. % or less.

[3] The microbial oil/lipid described in item 1 or 2, wherein as the constituent fatty acid of the oil, a total content of C24:0 and C22:0 is 11.0 wt. % or less, 10.0 wt. % or less, 9.0 wt. % or less, 8.0 wt. % or less, or 7.5 wt. % or less.

[4] The microbial oil/lipid described in any one of items 1 to 3, wherein as the constituent fatty acid of the oil, a total content of C24:0, C22:0, and C20:0 is 12.0 wt. % or less, 11.0 wt. % or less, 10.0 wt. % or less, 9.0 wt. % or less, or 8.0 wt. % or less.

[5] A microbial oil/lipid comprising dihomo-γ-linolenic acid as a constituent fatty acid of the oil in a content of more than 30 wt. %, more than 32 wt. %, or more than 34 wt. %, wherein a content of C24:0 is 8.5 wt. % or less, 7.0 wt. % or less, 6.0 wt. % or less, or 5.5 wt. % or less.

[6] The microbial oil/lipid described in item 5, wherein as the constituent fatty acid of the oil, a total content of the C24:0 and C22:0 is 11.0 wt. % or less, 10.0 wL % or less, 9.0 wt. % or less, 8.0 wt. % or less, or 7.5 wt. % or less.

[7] The microbial oil/lipid described in item 5 or 6, wherein as the constituent fatty acid of the oil, a content of the C24:0, C22:0, and C20:0 is 12.0 wt. % or less, 11.0 wt. % or less, 10.0 wt. % or less, 9.0 wt. % or less, or 8.0 wt. % or less.

[8] A microbial oil/lipid comprising dihomo-γ-linolenic acid as a constituent fatty acid of the oil in a content of greater than 30 wt. %, greater than 32 wt. %, or greater than 34 wt. %, wherein a total content of C24:0 and C22:0 is 11.0 wL % or less, 10.0 wt. % or less, 9.0 wL % or less, 8.0 wt. % or less, or 7.5 wt. % or less.

[9] The microbial oil/lipid described in item 8, wherein as the constituent fatty acid of the oil, a total content of the C24:0, the C22:0, and C20:0 is 12.0 wL % or less, 11.0 wt. % or less, 10.0 wt. % or less, 9.0 wt. % or less, or 8.0 wt. % or less.

[10] A microbial oil/lipid comprising dihomo-γ-linolenic acid as a constituent fatty acid of the oil in the content of greater than 30 wt. %, greater than 32 wt. %, or greater than 34 wt. %, wherein a total content of C24:0, C22:0, and C20:0 is 12.0 wt. % or less, 11.0 wt. % or less, 10.0 wt. % or less, 9.0 wt. % or less, or 8.0 wt. % or less.

[11] A microbial oil/lipid comprising dihomo-γ-linolenic acid as a constituent fatty acid of the oil, wherein a compositional ratio of arachidonic acid to the dihomo-γ-linolenic acid as the constituent fatty acids of the oil is 1/120 or less, 1/180 or less, 1/360 or less, 1/1000 or less, 1/2350 or less, or 1/3000 or less in terms of weight ratio.

[12] The microbial oil/lipid described in item 11, wherein a compositional ratio of C24:0 to the dihomo-γ-linolenic acid as the constituent fatty acid of the oil is 1/4.1 or less, 1/5.0 or less, or 1/6.0 or less in terms of weight ratio.

[13] The microbial oil/lipid described in item 11 or 12, wherein a compositional ratio of a total of C24:0 and C22:0 to the dihomo-γ-linolenic acid as the constituent fatty acid of the oil is 1/3.1 or less, 1/4.0 or less, or 1/5.0 or less in terms of weight ratio.

[14] The microbial oil/lipid described in any one of items 11 to 13, wherein a compositional ratio of long-chain saturated fatty acid to the dihomo-γ-linolenic acid as the constituent fatty acid of the oil is 1/3.0 or less, 1/3.9 or less, or 1/4.8 or less in terms of weight ratio.

[15] A microbial oil/lipid comprising dihomo-γ-linolenic acid as a constituent fatty acid of the oil, wherein a compositional ratio of C24:0 to the dihomo-γ-linolenic acid as the constituent fatty acid of the oil is 1/4.1 or less, 1/5.0 or less, or 1/6.0 or less in terms of weight ratio.

[16] The microbial oil/lipid described in item 15, wherein a compositional ratio of a total of C24:0 and C22:0 to the dihomo-γ-linolenic acid as the constituent fatty acid of the oil is 1/3.1 or less, 1/4.0 or less, or 1/5.0 or less in terms of weight ratio.

[17] The microbial oil/lipid described in item 15 or 16, wherein a compositional ratio of a total of C24:0, C22:0, and C20:0 to the dihomo-γ-linolenic acid as the constituent fatty acid of the oil is 1/3.0 or less, 1/3.9 or less, or 1/4.8 or less in terms of weight ratio.

[18] A microbial oil/lipid comprising dihomo-γ-linolenic acid as a constituent fatty acid of the oil, wherein a compositional ratio of a total of C24:0 and C22:0 to the dihomo-γ-linolenic acid as the constituent fatty acid of the oil is 1/3.1 or less, 1/4.0 or less, or 1/5.0 or less in terms of weight ratio.

[19] The microbial oil/lipid described in item 18, wherein a compositional ratio of a total of the C24:0, the C22:0, and C20:0 to the dihomo-γ-linolenic acid as the constituent fatty acid of the oil is 1/3.0 or less, 1/3.9 or less, or 1/4.8 or less in terms of weight ratio.

[20] A microbial oil/lipid comprising dihomo-γ-linolenic acid as a constituent fatty acid of the oil, wherein a compositional ratio of a total of C24:0, C22:0, and C20:0 to the dihomo-γ-linolenic acid as the constituent fatty acid of the oil is 1/3.0 or less, 1/3.9 or less, or 1/4.8 or less in terms of weight ratio.

[21] The microbial oil/lipid described in any one of items 11 to 20, comprising substantially no arachidonic acid as the constituent fatty acid of the oil or comprising arachidonic acid in a content of 0.3 wt. % or less, 0.2 wt. % or less, 0.1 wt. % or less, 0.05 wt. % or less, 0.04 wt. % or less, 0.03 wt. % or less, or 0.01 wt. % or less.

[22] The microbial oil/lipid described in any one of items 11 to 21, wherein a content of dihomo-γ-linolenic acid is greater than 30 wt. %, greater than 32 wt. %, or greater than 34 wt. %.

[23] The microbial oil/lipid described in any one of items 1 to 22, wherein the microbial oil/lipid is derived from a filamentous fungus.

[24] The microbial oil/lipid described in item 23, wherein the filamentous fungus is a filamentous fungus of a genus *Mortierella*.

[25] The microbial oil/lipid described in any one of items 1 to 24, wherein the microorganism is cultured without a Δ5 desaturase inhibitor.

[26] A microbial oil/lipid including the microbial oil/lipid described in any one of items 1 to 25, wherein the microbial oil/lipid is a crude oil.

[27] A pharmaceutical composition including the microbial oil/lipid described in any one of items 1 to 26.

[28] An anti-allergic agent or an anti-inflammatory agent comprising the microbial oil/lipid described in any one of items 1 to 26.

[29] A lower alcohol ester composition or a free fatty acid composition including dihomo-γ-linolenic acid, obtained or obtainable by a method including providing the microbial oil/lipid described in any one of items 1 to 26 to an ester exchange reaction or a hydrolysis reaction.

[30] The composition described in item 29, comprising the dihomo-γ-linolenic acid in a content of greater than 30 wt. %, greater than 32 wt. %, or greater than 34 wt. %.

[31] The composition described in item 29 or 30, including substantially no arachidonic acid or comprising arachidonic acid in a content of 0.3 wt. % or less, 0.2 wt. % or less, 0.1 wt. % or less, 0.05 wt. % or less, 0.04 wt. % or less, 0.03 wt. % or less, or 0.01 wt. % or less.

[32] The composition described in any one of items 29 to 31, wherein a content of C24:0 is 8.5 wt. % or less, 7.0 wt. % or less, 6.0 wt. % or less, or 5.5 wt. % or less.

[33] The composition described in any one of items 29 to 32, wherein a total content of C24:0 and C22:0 is 11.0 wt. % or less, 10.0 wt. % or less, 9.0 wt. % or less, 8.0 wt. % or less, or 7.5 wt. % or less.

[34] The composition described in any one of items 29 to 33, wherein a content of C24:0, C22:0, and C20:0 is 12.0 wt. % or less, 11.0 wt. % or less, 10.0 wt. % or less, 9.0 wt. % or less, or 8.0 wt. % or less.

[35] The composition described in any one of items 29 to 34, wherein a compositional ratio of arachidonic acid to the dihomo-γ-linolenic acid as a constituent fatty acid of an oil is 1/120 or less, 1/180 or less, 1/360 or less, 1/1000 or less, 1/2350 or less, or 1/3000 or less in terms of weight ratio.

[36] The composition described in any one of items 29 to 35, wherein a compositional ratio of C24:0 to the dihomo-γ-linolenic acid as a constituent fatty acid of an oil is 1/4.1 or less, 1/5.0 or less, or 1/6.0 or less in terms of weight ratio.

[37] The composition described in any one of items 29 to 36, wherein a compositional ratio of a total of C24:0 and C22:0 to the dihomo-γ-linolenic acid as a constituent fatty acid of an oil is 1/3.1 or less, 1/4.0 or less, or 1/5.0 or less in terms of weight ratio.

[38] The composition described in any one of items 29 to 37, wherein a compositional ratio of a total of C24:0, C22:0, and C20:0 to the dihomo-γ-linolenic acid as a constituent fatty acid of an oil is 1/3.0 or less, 1/3.9 or less, or 1/4.8 or less in terms of weight ratio.

[39] The composition described in any one of items 29 to 38, being used for medicine and, for example, used as an anti-allergic agent or an anti-inflammatory agent.

[40] Use of the microbial oil/lipid described in any one of items 1 to 26 or the composition described in any one of items 29 to 39 in production of foodstuffs, supplements, medicaments, cosmetics, or animal feed.

[41] A microbial biomass containing the microbial oil/lipid described in any one of items 1 to 26.

[42] A foodstuff, a supplement, a medicament, a cosmetic, or an animal feed comprising the microbial biomass described in item 41.

[43] A culture comprising the microbial biomass described in item 41.

[44] The culture described in item 43, comprising the microbial oil/lipid in a content of 0.4 g/liter or greater.

[45] A method of producing a dihomo-γ-linolenic acid-containing microbial oil/lipid including substantially no ARA, the method comprising culturing, in a culture medium, a microorganism strain having a mutation in a Δ5 desaturase gene to produce the dihomo-γ-linolenic acid-containing microbial oil/lipid.

[46] The method described in item 45, wherein the microorganism strain has a gene mutation that results in an amino acid substitution of Y310C of SEQ ID NO: 3 of a Δ5 desaturase.

[47] The method described in item 45 or 46, wherein the microorganism strain has a base deletion at positions from 2206 to 2234 of SEQ ID NO: 1 of the Δ5 desaturase gene.

[48] The method described in any one of items 45 to 47, wherein the microorganism strain is a strain of a microorganism belonging to a genus *Mortierella*.

[49] The method described in any one of items 45 to 48, wherein a microorganism having accession number NITE BP-02778 is used as the microorganism strain.

[50] A microorganism having accession number NITE BP-02778.

Advantageous Effects of Invention

The present disclosure can provide a microbial oil/lipid containing dihomo-γ-linolenic acid (DGLA) in which an undesired constituent fatty acid is reduced, and wherein the DGLA in the oil has high purity as compared with a microbial oil/lipid obtained by the known method.

BRIEF DESCRIPTION OF DRAWING

FIG. 1 shows a nucleic acid sequence comparison between a Δ5 desaturase gene of a *Mortierella alpina* RD056399 strain and a Δ5 desaturase gene of a *Mortierella alpina* NSM243-16 strain.

DESCRIPTION OF EMBODIMENTS (1) Microbial Oil/Lipid

In the present disclosure, unless otherwise noted, the term "microbial oil/lipid" is taken to widely mean all lipids obtained from a microorganism, and this term is used in the present disclosure without distinguishing between crude oils and refined oils. The microbial oil/lipid is an oil derived from a filamentous fungus as an example, and as a further example, an oil derived from a filamentous fungus of the genus *Mortierella* (hereinafter referred to as *Mortierella* oil). The microbial oil/lipid can be obtained by culturing a microorganism in a suitable culture medium and collecting the microorganism from the microbial biomass by a method such as solvent extraction. The lipids in the microbial oil can include triglycerides, diglycerides, monoglycerides, phospholipids, cholesterol, and the like, and the lipids are mainly comprised of triglycerides. Various types of fatty acids are included as the constituent fatty acids of the lipids. In the microbial oil/lipid of the present disclosure, among these constituent fatty acids, dihomo-γ-linolenic acid (DGLA) is contained with high purity as a constituent fatty acid of an oil. In the present disclosure, high purity refers simply to a high content of DGLA, but may also refer to a reduction of undesirable constituent fatty acid. Thus, the microbial oil/lipid of the present disclosure can be characterized by the content of DGLA in the microbial oil/lipid and/or the reduction of an undesirable constituent fatty acid. More specifically, the microbial oil/lipid of the present disclosure can be characterized by the DGLA content and an ARA content and can be further characterized by a content of long-chain saturated fatty acids. In another aspect, the microbial oil/lipid of the present disclosure can be characterized by the DGLA content and the content of long-chain saturated fatty acid and can be further characterized by the ARA content. In the present disclosure, the content is not limited only by the content or a compositional ratio to DGLA, and may simply represent the presence of a specific compound.

For convenience, the term "oil" is used in the present disclosure to indicate "oil and fat". Although the terms "oil" and "oil and fat" may be narrowly defined as triglycerides, in the present disclosure, these terms are taken to include oils, such as crude oils, mainly comprised of triglycerides and containing other lipid components such as diglycerides, monoglycerides, phospholipids, cholesterol, and free fatty acids. Indeed, a triglyceride content is 30 wt. % or greater, 50 wt. % or greater, 70 wt. % or greater, or 90 wt. % or greater of the oil.

For convenience, the term "fatty acid" not only indicates a free saturated or unsaturated fatty acid itself, but also includes fatty acids contained as constituent units in alkyl esters, triglycerides, diglycerides, monoglycerides, phospholipids, steryl esters, and the like, which can also be called constituent fatty acids. In the present disclosure, unless otherwise noted, the forms of compounds containing fatty acids may be omitted. Examples of forms of compounds containing fatty acids may include a free fatty acid form, a fatty acid alkyl ester form, a glyceryl ester form, a phospholipid form, and a steryl ester form. Compounds containing the same fatty acids may be contained in a single form or may be contained as a mixture of two or more forms in the oil.

For denoting fatty acids, a numerical expression may be used, in which the number of carbons, the number of double bonds, and the locations of double bonds are each expressed in a simplified manner using numbers and alphabets, respectively. For example, a saturated fatty acid having 20 carbon atoms is expressed as "C20:0", and a trivalent unsaturated fatty acid having 20 carbon atoms and having three double bonds in the carbon chain is expressed as "C20:3". For example, behenic acid may be expressed as "C22:0", and arachidonic acid may be expressed as "C20:4, n-6", etc. The "n-" indicates the position of the first double bond counted from the methyl end of the fatty acid. For example, "n-6" indicates that the position of the double bond is the sixth position counted from the methyl end of the fatty acid, and "n-3" indicates that the position of the double bond is the third position from the methyl end of the fatty acid. This method is known to those of ordinary skill in the art, and those of ordinary skill in the art can easily specify fatty acids expressed in accordance with this method.

In the present disclosure, the term "step" includes not only an independent step but also a step that cannot be clearly distinguished from other steps provided that an intended object of the step is achieved. In the present disclosure, numerical ranges indicated by "to" are ranges including the numerical values described before and after the "to" as the minimum and maximum values, respectively. In the present disclosure, when the mixture contains a plurality of substances that correspond to each component, unless otherwise specified, the content of each component in the mixture means the total content of the plurality of substances present in the mixture. In the present disclosure, the term "or less" or "less than" with regard to a percentage includes 0%, that is, "not containing", or means inclusion of a range including a value undetectable by existing means, unless the lower limit value is specifically stated.

DGLA is contained in the microbial oil/lipid of the present disclosure, and the content of DGLA is more than 30 wt. %, more than 31 wt. %, more than 32 wt. %, or more than 34 wt. % as the constituent fatty acid of the microbial oil. The upper limit of the content of dihomo-γ-linolenic acid is not particularly limited, and from the viewpoint of productivity of a microorganism, the upper limit is usually 70 wt. % or less or 60 wt. % or less.

Constituent fatty acids that are not desired in the microbial oil/lipid of the present disclosure include ARA and/or long-chain saturated fatty acid. While ARA is classified as an essential fatty acid, it is known that ARA causes inflammation, and it is desired to reduce ARA from that viewpoint. Long-chain saturated fatty acid is desired to be reduced in terms of increasing a melting point of an oil.

In the microbial oil/lipid of the present disclosure, the content of ARA is reduced. In one aspect, ARA is substantially not contained in the microbial oil/lipid of the present disclosure. In another aspect, in the microbial oil/lipid of the present disclosure, ARA is 0.3 wt. % or less, 0.2 wt. % or less, 0.1 wt. % or less, 0.05 wt. % or less, 0.04 wt. % or less, 0.03 wt. % or less, or 0.01 wt. % or less of the constituent fatty acid of the microbial oil/lipid. Microbial oil/lipids (especially *Mortierella* oil) containing DGLA with a high purity (for example, greater than 30 wt. %) and substantially not containing ARA or containing less than 0.05 wt. % of ARA are not previously known. Thus, by using the microbial oil/lipid of the present disclosure, it is possible to efficiently provide an oil containing DGLA with a high purity as compared with the known oils and containing a low content of ARA.

When C24:0 is the representative long-chain saturated fatty acid, related is a microbial oil/lipid in which a compositional ratio of C24:0 to dihomo-γ-linolenic acid can be indexed and is 1/4.1 or less, 1/4.5 or less, 1/5.0 or less, 1/6.0 or less, 11.0 or less, or 11.5 in terms of weight ratio. In another aspect, related is a microbial oil/lipid in which as the constituent fatty acid, a content of C24:0 is 8.5 wt. % or less, 7.0 wt. % or less, 6.0 wt. % or less, 5.5 wL % or less, 5.0 wt. % or less, or 4.5 wt. % or less. The lower limit of the content of C24:0 is 0 wt. % in one example. As another example, the lower limit of the content of C24:0 is usually 1 wt. % or greater from the perspective of using a microorganism.

When C24:0 and C22:0 are as the representative long-chain saturated fatty acids, related is a microbial oil/lipid in which a total compositional ratio of C24:0 and C22:0 to dihomo-γ-linolenic acid can be indexed and is 1/3.1 or less, 1/4.0 or less, or 1/5.0 or less in terms of weight ratio. In another aspect, related is a microbial oil/lipid in which as the constituent fatty acid, a content of a total amount of C24:0 and C22:0 is 11.0 wt. % or less, 10.0 wt. % or less, 9.0 wt. % or less, 8.0 wt. % or less, 7.5 wt. % or less, 7.0 wt. % or less, or 6.5 wt. % or less. The lower limit of the content of the total amount of C24:0 and C22:0 is 0 wt. % in one example. As another example, the lower limit of the content of the total amount of C24:0 and C22:0 is usually 1 wt. % or greater from the perspective of using a microorganism.

When C24:0, C22:0, and C20:0 are as the representative long-chain saturated fatty acids, related is a microbial oil/lipid in which a total compositional ratio of C24:0, C22:0, and C20:0 to dihomo-γ-linolenic acid can be indexed and is 1/3.0 or less, 1/3.5 or less, 1/4.0 or less, or 1/4.5 or less in terms of weight ratio. In another aspect, related is a microbial oil/lipid in which a content of a total amount of C24:0, C22:0, and C20:0 is 12.0 wt. % or less, 10.0 wt. % or less, 9.0 wt. % or less, 8.0 wt. % or less, or 7.5 wt. % or less in the constituent fatty acid. The lower limit of the total content of C24:0, C22:0, and C20:0 is 0 wt. % in one example. As another example, the lower limit of the total content of C24:0, C22:0, and C20:0 is usually 1 wt. % or more from the perspective of using a microorganism.

In the present disclosure, although a content of DGLA and undesirable constituent fatty acid may be expressed as a weight ratio (undesirable constituent fatty acid/DGLA), the content may also be expressed using a weight ratio (DGLA/undesirable constituent fatty acid). As the undesirable constituent fatty acid, ARA and/or long-chain saturated fatty acid are/is used.

In the present disclosure, "undesirable constituent fatty acid/DGLA" or "DGLA/undesirable constituent fatty acid" is the weight ratio of undesirable constituent fatty acid and DGLA by analysis of a fatty acid composition contained in the oil. The fatty acid composition may be determined by the usual method. Specifically, the oil to be analyzed is esterified with a lower alcohol and a catalyst to obtain fatty acid lower alcohol esters. Thereafter, the obtained fatty acid lower alcohol esters are analyzed using gas chromatography. The peaks corresponding to each fatty acid are identified in the obtained gas chromatography, and the peak area of each fatty acid is determined, e.g. using the Agilent ChemStation integration algorithm (revision C.01.03 [37], Agilent Technologies). "Peak area" indicates the ratio of the peak area for a respective component to the area of all peaks, that is, the proportion of content of the component of the peak, as determined by the analytical chart obtained from gas chromatography or thin-layer chromatography/flame ionization detector (TLC/FID) of oil having various fatty acids as constituent components. The fatty acid composition was determined by gas chromatography according to the method indicated in the examples, for example. The lipid composition was determined using TLC/FID. Detailed conditions are indicated in examples.

In the present disclosure, the term "crude oil" of the microbial oil/lipid refers to a mixture of lipids as obtained simply by extraction of lipids from the microbial biomass. The refined oil of microbial oil/lipid is a microbial oil/lipid obtained by refining this microbial oil/lipid to remove phospholipids and cholesterol and thereby increase the proportion of triglycerides. The term "microbial oil/lipid" in the present disclosure means both the crude oil and refined oil unless otherwise noted. It is known that ARA and DGLA have similar properties as compounds, and it is extremely difficult to separate DGLA from ARA by actual production scale. In the present disclosure, the content or compositional ratio of DGLA and undesirable constituent fatty acid in the microbial oil/lipid may be the same as or similar to the content or compositional ratio of DGLA and undesirable constituent fatty acid in a lower alcohol ester composition and/or a free fatty acid composition obtained from the microbial oil/lipid. In particular, the weight ratio of DGLA and ARA as the undesirable constituent fatty acid is similar in the microbial oil/lipid and the lower alcohol ester composition and/or the free fatty acid composition. In the present disclosure, a microbial oil/lipid in which the ARA content is low, in other words, the difference between a DGLA content and an ARA content is large at the stage of the crude oil, can be provided, and therefore the ability to obtain a very high ratio of DGLA to ARA in a refined and/or chemically-treated form of the product can be markedly increased. The microbial oil/lipid of the present disclosure may be produced by culturing a microorganism characterized in the present disclosure. In one aspect, the production process does not use a culture medium supplemented with a Δ5 desaturase inhibitor. Thus, in one aspect, the microbial oil/lipid in the present disclosure contains no Δ5 desaturase inhibitor.

Examples of the Δ5 desaturase inhibitors include desaturase inhibitors known in the art. Examples of the desaturase inhibitors include dioxabicyclo[3.3.0]octane derivatives. Examples of the dioxabicyclo[3.3.0]octane derivative include sesamin, sesaminol, episesamin, episesaminol, sesamolin, 2-(3,4-methylenedioxyphenyl)-6-(3-methoxy-4-hydroxyphenyl)-3,7-dioxabicyclo[3.3.0]octane, 2,6-bis-(3-methoxy-4-hydroxyphenyl)-3,7-dioxabicyclo[3.3.0]octane, 2-(3,4-methylenedioxyphenyl)-6-(3-methoxy-4-hydroxyphenoxy)-3,7-dioxabicyclo[3.3.0]octane, and the like.

In the present disclosure, the term "refined oil" is taken to mean an oil obtained after refining process, including degumming process, deacidification process, decoloring process, deodorization process and the like, in any combination of some or all of them, for removing substances other than the target substance, such as removing phospholipids and sterols.

Moreover, the content of triglyceride in the crude oil with respect to the total amount of the microbial oil/lipid is 70 wt. % or greater in the microbial oil/lipid, or 90 wt. % or greater. When the content of triglyceride in the microbial oil/lipid is 70 wt. % or greater, there is a tendency for moisture absorption not being excessively low, such that e.g. good flowability may be obtained. Although the upper limit of the content of triglyceride in the microbial oil/lipid is not particularly limited, generally the weight ratio of triglycerides in the microbial oil/lipid is 99 wt. % or less. The weight ratio of triglyceride in the microbial oil/lipid may be 100 wt. %, that is, the microbial oil/lipid may substantially not contain components other than glyceride. Examples of fatty acids constituting triglyceride in the microbial oil/lipid include saturated or unsaturated fatty acids having from 14 to 26 carbon atoms. The refined oil may have an increased concentration of triglyceride due to removal of impurities by, for example, known methods.

The fatty acid composition in the crude oil may contain 60 wt. % or less, 55 wt. % or less, or 50 wt. % or less of fatty acid having 18 or less carbon atoms, with respect to a total weight of the microbial oil/lipid. A microbial oil/lipid having a low content of fatty acids having 18 or less carbon atoms in the crude oil may be used as triglyceride without the need to adjust the fatty acid composition by removing fatty acids having 18 or less carbon atoms. Such adjustment needs a method with low yields such as wintering (low temperature treatment) or the like.

A phospholipid content in the crude oil is 10 wt. % or less, 5 wt. %, or 1 wt. % or less with respect to the total weight of the microbial oil/lipid. However, phospholipid may be present to some extent, such as from 0.1 to 10 wt. %, from 0.5 to 7 wt. %, or from 1 to 5 wt. % with respect to the total weight of the microbial oil/lipid.

(2) Microorganism

In the present disclosure, the term "microorganism" includes both eukaryotes and prokaryotes, as exemplified specifically by bacteria, actinomycetes, cyanobacteria, archaea, fungi, algae, lichens, protozoa, and the like. From the viewpoint of having a DGLA production function, the microorganism used in the present disclosure can be, for example, a filamentous fungus and, more specifically, at least one selected from the group consisting of microorganisms of the genus *Mortierella*, the genus *Conidiobolus*, the genus *Pythium*, the genus *Phytophthora*, the genus *Penicillium*, the genus *Cladosporium*, the genus *Mucor*, the genus *Fusarium*, the genus *Aspergillus*, the genus *Rhodotorula*, the genus *Entomophthora*, the genus *Echinosporangium*, and the genus *Sapmlegnia*. The microorganism should be a microorganism that has the ability to produce DGLA, and it is possible to use a microorganism belonging to the genus *Mortierella*, such as *Mortierella elongata, Mortierella exigua, Mortierella hygrophila*, and *Mortierella alpina*. In one aspect, the microorganism according to the present disclosure is a *Mortierella alpina* or related species, and is, for example, the RD056399 strain.

From the viewpoint of reducing a production amount of ARA, the microorganism is a microorganism having reduced or lost 45 desaturation activity (referred to hereinafter as a "low Δ5 desaturation activity microorganism") as compared with a natural state. Although a mutation can be introduced to any microorganism described above, as an example, the mutation can be introduced to a microorganism of the genus *Mortierella*, more specifically, to a *Mortierella alpina* or related species. As an example, a mutation is induced in the 45 desaturase gene of the RD056399 strain. The mutation introduced into the 45 desaturase gene includes, as an example, mutations that result in a mutation of tyrosine (Y) at position 310 of SEQ ID NO: 3 to cysteine (C) (hereinafter designated as Y310C). Additionally or independently, the gene may be mutated so as to result in a splicing error due to deletion of the base at positions from 2206 to 2234 of SEQ ID NO: 1. The microorganism used in the present disclosure is a microorganism having accession number NITE BP-02778 (NSM243-16 strain).

Examples of mutagenesis procedure include physical treatments such as irradiation (X-rays, γ-rays, neutron beam, or the like), ultraviolet irradiation, and heat treatment; and chemical treatments with a compound serving as a mutagen. Examples of a mutagen used in making a mutant strain can include alkylating agents such as nitrogen mustard, methyl methane sulfonate (MMS), N-methyl-N'-nitroso-N-nitrosoguanidine (NTG), and the like; base analogs such as 5-bromouracil; antibiotics such as mitomycin C; inhibitors for base synthesis such as 6-mercaptopurine and the like; dyes such as proflavine and the like; carcinogens such as 4-nitroquinoline-N-oxide and the like; and manganese chloride, potassium dichromate, nitrous acid, hydrazine, hydroxylamine, formaldehyde, nitrofuran compounds, and the like. Moreover, the form of the microorganism targeted for mutation may be the growing microbial biomass (mycelia or the like) or spores.

(3) Production of Microbial Oil/Lipid

The microbial oil/lipid can be obtained by a production method including producing microbial oil/lipid by culturing a microorganism known to produce lipids (referred to hereinafter as the culturing/production step), and separating the obtained microbial oil/lipid from the microbial biomass (referred to hereinafter as the separation step).

(3-1) Culturing/Production Step

A method of producing a DGLA-containing lipid or the method of producing a microbial oil/lipid in the present disclosure includes a step of culturing a microorganism referred to in the present disclosure in a culture medium. By selection of a suitable microorganism that favors DGLA over ARA production, e.g., a mutated ARA producing strain according to the known principles, synthesis of ARA in the microbial biomass may be inhibited, and an accumulated amount of DGLA in the microbial biomass can increase markedly.

The culture medium used in the production step can be any culture medium known in the art. In particular, a culture medium suitable for culturing a filamentous fungus and a microorganism of the genus *Mortierella* can be used.

In a case of a liquid culture medium, any of generally used carbon sources including glucose, fructose, xylose, saccharose, maltose, soluble starch, molasses, glycerol, mannitol, and the like, can be used; however, the carbon source is not limited to these.

The nitrogen source can be a natural nitrogen source such as peptone, yeast extract, malt extract, meat extract, casamino acid, corn steep liquor, as well as organic nitrogen sources such as urea, and inorganic nitrogen sources such as sodium nitrate, ammonium nitrate, ammonium sulfate. In addition, trace nutrient sources such as inorganic salts like phosphates, magnesium sulfate, iron sulfate, copper sulfate, and the like as well as vitamins or the like can also be used if necessary. When foaming occurs during culturing, an anti-foaming agent can be used. As the anti-foaming agent, a soybean oil, Adeka nol LG-109, Dow 1520US, Basildon 86/013K, Mazu 310R, Hodag K-60, polypropylene glycol, and the like can be used.

The aqueous solvent usable as the base material of the liquid culture medium is basically water, and may be distilled water or purified water. In one aspect, Δ5 desaturase inhibitor is not added to the liquid culture medium.

These culture media components are not particularly limited as long as the concentration is a concentration that does not interfere with the growth of the low Δ5 desaturation activity microorganism. For practical purposes, the concentration of carbon source is from 0.1 wt. % to 30 wt. %, or from 1 wt. % to 10 wt. %, and the concentration of nitrogen source is from 0.01 wt. % to 5 wt. %, or from 0.1 wt. % to 2 wt. %. A culture temperature is from 5° C. to 40° C., from 20° C. to 38° C., or from 25° C. to 35° C. A pH of the culture medium is from 4 to 10, or from 6 to 9. Culturing may be an aeration-stirring culturing, shake culturing, or static culturing. Culturing is normally performed for 2 days to 15 days. The aeration rate during aeration-stirring culturing may be applying a normally used aeration rate as is.

In order to promote the accumulation of DGLA, it is possible to add to the culture medium a component for forming a substrate for the production of ARA and/or DGLA. Examples of the substrate for the production of ARA and/or DGLA include hydrocarbons such as tetradecane, hexadecane, octadecane, and the like; fatty acids such as tetradecanoic acid, hexadecanoic acid, octadecanoic acid, and the like; salts of such fatty acids, such as sodium salts and potassium salts; fatty acid esters; oils-fats containing fatty acids as constituent components, such as olive oil, soybean oil, cottonseed oil, and palm oil; and the like. However, the substrate is not limited to these.

A culture vessel used in the production step is not particularly limited, and any culture vessel may be used that is normally used for the culturing of microorganisms. The culture vessel may be selected appropriately according to the scale of culturing.

For example, in the case of liquid culturing at the 1 L to 50 L scale, a stirred type culture vessel can be used as the culture vessel in order to produce a DGLA-containing microbial oil/lipid with higher purity. The stirred type culture vessel has at least one disc turbine type agitator blade, and in another aspect, a stirred type culture vessel has two disc turbine type agitator blades. In the case of a stirred type culture vessel equipped with two disc turbine type agitator blades, a distance between the agitator blades that are closer to the bottom surface may be small in order to efficiently stir the culture medium at the culture vessel bottom surface. For example, the positions of placement of the upper and lower agitator blades may be selected appropriately.

A culture can be obtained by performing the production step. The culture refers to all of those obtained by culturing, and includes microbial oil/lipids, microbial biomass, and culture media. The "culture including the microbial biomass" is particularly the culture in which the "microbial biomass" is cultured, and means a state prior to separation of the microbial biomass from the culture. From the culture, the microbial biomass containing microbial oil/lipid can be obtained. The "microbial biomass containing microbial oil/lipid" means a microbial biomass that accumulates the microbial oil/lipid within the microbial biomass by culturing the microorganism that produces the microbial oil/lipid of the present disclosure. Both living microorganisms and dead microorganisms may be included in the microbial biomass. A dried microbial biomass is also included. The expression dried microbial biomass is taken to mean a dried product of microbial biomass including substantially no water as well as the dried product including residual culture medium components, filtration aids, and the like. The expression "including substantially no water" means that the moisture content is at or below the amount that would result in difficulty for the microorganism to live. This amount is generally 15 wt. % or less moisture content, or 10 wt. % or less moisture content. According to the present disclosure, there is provided a microbial oil/lipid and a microbial biomass, which include DGLA and in which undesirable constituent fatty acid content is reduced. Of such microbial oil/lipids and microbial biomass, microbial oil/lipids and microbial biomass that substantially do not contain ARA or contain ARA in a content of less than 0.05 wt. %, 0.03 wt. % or less, or 0.01 wt. % or less are not previously known. Thus, by using the microbial oil/lipid of the present disclosure and the microbial biomass of the present disclosure, it is possible to efficiently provide an oil containing DGLA with a high purity as compared with the known oils and containing a low content of ARA.

(3-2) Separation Step

In the separation step, the microbial oil/lipid containing DGLA produced during the production step is separated from the microbial biomass. The separation step includes: separation of the cultured microbial biomass from the culture medium used in culturing (referred to hereinafter as the microbial biomass separation step); and harvesting of the microbial oil/lipid containing DGLA from the cultured microbial biomass (referred to hereinafter as the microbial oil/lipid harvesting step), i.e. obtaining of the crude oil. During the microbial biomass separation step and the microbial oil/lipid harvesting step, a separation method and an extraction method are used according to the form of culturing, so that the DGLA-containing microbial oil/lipid is harvested from the cultured microbial biomass.

When the liquid culture medium is used, after completion of culturing, the cultured microbial biomass can be separated from the culture medium by use of a usual means for solid-liquid separation such as a centrifugal separation and/or filtration. The microbial biomass is washed sufficiently using water, and then is optionally dried. Drying may be performed by freeze drying, air-drying, heating-drying, or the like. If a solid culture medium is used for culturing, the solid culture medium and microbial biomass may be crushed using a homogenizer or the like without separation of the microbial biomass from the culture medium, and the obtained crushed material may be directly supplied to the microbial oil/lipid harvesting step.

The microbial oil/lipid harvesting step may include extraction treatment of the dried microbial biomass obtained in the microbial biomass separation step, and such extraction treatment is performed by the use of an organic solvent under nitrogen gas stream. The utilized organic solvent includes ether, hexane, methanol, ethanol, chloroform, dichloromethane, petroleum ether, and the like. Alternatively, good results can be obtained by alternating extraction using methanol and petroleum ether; or extraction using a single layer type solvent of chloroform-methanol-water. A microbial oil/lipid containing a high concentration of DGLA is obtained by distilling off the organic solvent from the extract under reduced pressure. Hexane is most generally used in the case of harvesting triglycerides.

Moreover, as an alternative to the aforementioned method, extraction may be performed using the moist microbial biomass. A solvent that is miscible with water, such as methanol or ethanol, or a mixed solvent miscible with water, containing the solvent and water and/or other solvent, is used. The remainder of the procedure is similar to that described above.

The harvested crude oil of the microbial oil/lipid may be refined by methods normally used for refining plant oils, fish oils, or the like. Normally used refining processes for oils/fats are exemplified by degumming, deacidification, decoloration, and deodorization processes. Such processes may be performed by any method. Degumming is exemplified by a water wash treatment. Deacidification treatment is exemplified by a distillation treatment. Decolorization treatment is exemplified by a treatment using activated clay, activated carbon, silica gel, or the like. Deodorization is exemplified by a steam distillation or the like.

(4) Production of Lower Alcohol Esters and Free Fatty Acids of Fatty Acid from Microbial Oil/Lipid The DGLA included as a constituent fatty acid of the microbial oil/lipid may be converted to a form of a lower alcohol ester by use of a catalyst, or a form of a free fatty acid by hydrolysis. In comparison to triglyceride, the lower alcohol ester or free fatty acid can be readily separated from other fatty acids, and it is possible to concentrate DGLA and increase purity.

A method of producing a lower alcohol ester or free fatty acid of the dihomo-γ-linolenic acid according to the present disclosure is a method including: (a) obtaining free fatty acids or lower alcohol esters by hydrolysis or alcoholysis of the microbial oil/lipid; and (b) rectifying a mixture of the free fatty acids or the lower alcohol esters to obtain free fatty acids or lower alcohol esters, in which the obtained free fatty acids have at least 20 carbon atoms. The mixture or the composition may further include (c) performing fractionation and purification of free fatty acid or lower alcohol ester of dihomo-γ-linolenic acid by reverse-phase distribution type column chromatography from the free fatty acid or lower alcohol ester, in which the fatty acids has at least 20 carbon atoms. For example, the lower alcohol dihomo-γ-linolenic acid ester or free dihomo-γ-linolenic acid may be purified or produced by producing a lower alcohol ester composition or free fatty acid composition as desired and then performing fractionation and purification of the lower alcohol ester of dihomo-γ-linolenic acid, or of dihomo-γ-linolenic acid, by reverse-phase distribution-type column chromatography.

A method of producing a lower alcohol ester of the dihomo-γ-linolenic acid according to the present disclosure may be a method including: (a) obtaining lower alcohol esters of fatty acids by alcoholysis of the microbial oil/lipid; (b) rectifying a mixture of the lower alcohol esters of the fatty acids to obtain a lower alcohol ester, in which the obtained fatty acids have at least 20 carbon atoms; and (c) performing fractionation and purification of a lower alcohol ester of dihomo-γ-linolenic acid by reverse-phase distribution type column chromatography from lower alcohol ester, in which the fatty acids has at least 20 carbon atoms.

A method of producing a free fatty acid of the dihomo-γ-linolenic acid according to the present disclosure may be a method including: (a) obtaining free fatty acids by hydrolysis of the microbial oil/lipid; (b) rectifying a mixture of the free fatty acids to obtain a free fatty acid having at least 20 carbon atoms; and (c) performing fractionation and purification of free dihomo-γ-linolenic acid by reverse-phase distribution type column chromatography from the free fatty acid having at least 20 carbon atoms.

The lower alcohol herein is exemplified by alcohols having 3 or fewer carbon atoms, particularly ethanol, methanol, or the like. The lower alcohol esters of DGLA are exemplified by methyl dihomo-γ-linolenate, ethyl dihomo-γ-linolenate, and the like.

For example, the methyl esters of the fatty acids are obtained by treatment of the microbial oil/lipid with from 5% to 10% of anhydrous methanol-hydrochloric acid, from 10% to 50% of $BF_3$-methanol, or the like, at room temperature for from 1 to 24 hours. The ethyl esters of the fatty acids are obtained by treatment of the microbial oil/lipid with from 1% to 20% of ethanol containing sulfuric acid or the like, for from 15 to 60 minutes at from 25° C. to 100° C. The methyl esters or the ethyl esters can be extracted from the reaction liquid using an organic solvent such as hexane, ether, or ethyl acetate. The extracted liquid is dried using anhydrous sodium sulfate or the like, and then the organic solvent is removed by distillation to obtain a composition containing fatty acid esters as main components.

In addition to the target DGLA lower alcohol ester, other fatty acid lower alcohol esters are included in the esterified composition obtained by esterification treatment. One type of isolation method, or a combination of two or more types of isolation methods may be used to isolate the DGLA lower alcohol ester from the mixture of these fatty acid lower alcohol esters. Such isolation methods are exemplified by the distillation method, rectification method, column chromatography, low temperature crystallization method, urea clathrate method, liquid-liquid countercurrent distribution chromatography, or the like. A combination of distillation or rectification, and column chromatography or liquid-liquid countercurrent distribution chromatography can be used.

For these methods, usual procedures may be applied. Reverse-phase distribution type (as an example, ODS) column chromatography can be used as the column chromatography.

In order to obtain the free fatty acid of DGLA, after the lower alcohol ester of the microbial oil/lipid is produced in the aforementioned manner, the purity of the DGLA lower alcohol ester is increased by refining, and then the DGLA lower alcohol ester is hydrolyzed to obtain high purity free DGLA. In order to obtain free DGLA from the DGLA lower alcohol ester, after hydrolysis using an alkaline catalyst, extraction treatment may be performed using an organic solvent such as ether, ethyl acetate, or the like.

Alternatively, the free fatty acid of DGLA may also be obtained directly from the microbial oil/lipid by hydrolysis. For example, the microbial oil/lipid undergoes alkaline decomposition, for example, for from 2 to 3 hours at room temperature using 5% sodium hydroxide to obtain a decomposed liquid, and then the free fatty acid of DGLA may be extracted or refined from the decomposed liquid by the methods usually used for extraction or refining of fatty acids.

The free acid or lower alcohol ester of DGLA obtained by the aforementioned method is produced using the microbial oil/lipid of the present disclosure as the raw material, and thus the composition has a low content of ARA, which is difficult to remove in the refining process. These compositions are produced or obtainable by a method including subjecting the microbial oil/lipid disclosed herein to an ester exchange reaction or hydrolysis reaction respectively. Thus, the content of dihomo-γ-linolenic acid and/or undesirable constituent fatty acid, especially ARA, in the lower alcohol ester composition and free fatty acid composition of the present disclosure may be substantially the same as the content in the microbial oil/lipid of the present disclosure. In this composition, ARA is substantially not contained, or the ARA content is less than 0.05 wt. %, 0.03 wt. % or less, or 0.01 wt. % or less.

(5) Microbial Biomass Containing Microbial Oil/Lipid

The "microbial biomass containing microbial oil/lipid" refers to a biomass of a microorganism which produces microbial oil/lipid within the microbial biomass. Since the microbial biomass retains the microbial oil/lipid of the present disclosure, the microbial biomass has a fatty acid composition in the same or similar configuration as the microbial oil/lipid. Specifically, a high purity of DGLA is contained, and undesirable constituent fatty acid is reduced. In particular, ARA is substantially not contained, or the ARA content is 0.3 wt. % or less, 0.2 wL % or less, 0.1 wt. % or less, 0.05 wt. % or less, 0.04 wt. % or less, 0.03 wL % or less, or 0.01 wL % or less. Long-chain unsaturated fatty acids in the microbial biomass can also be reduced in a similar manner as the microbial oil/lipid according to the present disclosure.

The DGLA/undesirable constituent fatty acid ratio in the microbial biomass is taken to be the value determined in the aforementioned manner. Any method may be used for measurement of DGLA and ARA in the microbial biomass, as long as the method is one normally used for measurement of relative weights of DGLA and ARA in a microbial biomass or equivalent. For example, the microorganisms may be recovered from the culture medium during growth, and esterification treatment may be performed by from 5% to 10% of anhydrous methanol-hydrochloric acid, from 10% to 50% of $BF_3$-methanol, from 1% to 20% sulfuric acid-methanol, from 1% to 20% of sulfuric acid-ethanol, or the like for from 15 minutes to 60 minutes treatment at from 25° C. to 100° C. Then, analysis of the fatty acid composition (%) in the fatty acid may be performed using gas chromatography with or without extraction of the ester forms. In the case of esterification for evaluation of substances other than the free fatty acids, treatment for from 15 to 60 minutes at from 25° C. to 100° C. using an alkoxide such as sodium methoxide, sodium ethoxide, or the like at a concentration of from 0.1 M to 10 M may be used. If the ester form is extracted after esterification, it is possible to use an organic solvent (hexane or the like) that is immiscible with the water soluble component.

Moreover, the microorganism is a microorganism capable of providing an oil that satisfies at least one condition, and in some cases any combination of two or more conditions, from among conditions such as the triglyceride content, content of fatty acids having less than 18 carbon atoms, content of phospholipids, content of saturated fatty acids, and the like that are described above for the microbial oil/lipid.

(6) Culture Containing Microbial Biomass Containing Microbial Oil/Lipid

The "culture containing microbial biomass containing the microbial oil/lipid" is taken to mean the culture prior to separation, from the culture medium, of microorganisms grown by the microbial oil/lipid production method described above. Thus, the culture contains a high purity of DGLA. In the present disclosure, the culture has a fatty acid composition in the same or similar configuration as the microbial oil/lipid of the present disclosure. Undesirable constituent fatty acid is reduced, and, for example, ARA is substantially not contained, or the ARA content is 0.3 wt. % or less, 0.2 wt. % or less, 0.1 wt. % or less, 0.05 wt. % or less, 0.04 wt. % or less, 0.03 wt. % or less, or 0.01 wt. % or less.

Moreover, considering the microbial oil/lipid in the microbial biomass in the culture, the culture may contain DGLA-containing oil, which is the microorganism-derived oil described above, in a content of 0.4 g/L or greater or 0.8 g/L or greater. In a case where the content of the oil containing microorganism-derived DGLA is 0.4 g/L or more, there is a tendency for advantages to be obtained such as lowering of production costs, improvement of quality stability, and the like.

The microorganism is grown by culturing, and DGLA is produced in the microbial biomass. Therefore, by recovery of the unmodified culture containing the microorganisms during the culturing step, it is possible to obtain a culture containing the microorganism. Moreover, due to production of the microbial oil/lipid that includes DGLA within the microbial biomass of the microorganism during the culturing step, it is possible to obtain the microbial oil/lipid-containing culture by recovering the unmodified culture containing microorganisms during the culturing step, or alternatively, the microorganisms in the culture may be disrupted by crushing or the like, and then the culture containing microbial oil/lipid released into the culture may be recovered. Furthermore, the culture containing the microbial oil/lipid and the culture medium contained in the microorganism-containing culture may be used, without modification, in the aforementioned manner.

Application

According to the present disclosure, the DGLA-containing microbial oil/lipid, the lower alcohol esters, the free fatty acids, the microbial biomass, and the microorganism-containing culture can each have a ratio of undesirable constituent fatty acid to DGLA that is lower than that of the previously known. Therefore, the DGLA-containing microbial oil/lipid, the lower alcohol esters, the free fatty acid, the microbial biomass, and the microorganism-containing culture according to the present disclosure are each extremely useful for applications requiring high purity DGLA or for applications requiring a reduction in undesirable constituent fatty acid, especially a reduction in ARA. Such applications can include preparing foodstuffs, supplements, medicament, cosmetics, animal feeds, and the like. Accordingly, the present disclosure relates to pharmaceutical compositions, cosmetic compositions, foodstuffs, supplements, or animal feeds containing the microbial oil/lipid, the lower alcohol ester, the free fatty acid, the microbial biomass, or the culture according to the present disclosure. In another aspect, the present disclosure also relates to microbial oil/lipids, lower alcohol esters, free fatty acids, microbial biomass, or cultures for use as a medicine. Use as the medicament, cosmetics, foodstuffs, supplements, or animal feeds of the present disclosure may be applied for the prevention, treatment, or amelioration of inflammatory or allergic disease. In yet another aspect, the present disclosure relates to a method of treating or preventing an inflammatory disease or allergic disease, the method including administering the microbial oil/lipid, the lower alcohol ester composition, the free fatty acid composition, the microbial biomass, or the culture according to the present disclosure to a subject. The method includes administering the microbial oil/lipid, the lower alcohol ester composition, the free fatty acid composition, the microbial biomass, or the culture according to the present disclosure to a subject suffering from, or at risk of suffering from, an inflammatory disease or allergic disease.

As described above, the medicament or cosmetic including or consisting in the microbial oil/lipid, the lower alcohol ester composition, the free fatty acid composition, the microbial biomass, or the culture is usually administered topically or orally. The medicament or cosmetic of the present disclosure may be administered topically (e.g., transdermal, intravenous, subcutaneous, intramuscular, intraperitoneal, transmucosal). An inflammatory disease or allergic disease to be treated, prevented, or ameliorated may be any skin inflammation, and examples thereof include, without limitation, atopic dermatitis; allergic contact dermatitis (ACD); irritant contact dermatitis (ICD); photocontact dermatitis; systemic contact dermatitis; rheumatism; psoriasis; lupus; skin inflammation associated with or caused by atopic eczema, contact dermatitis, psoriasis, or uremic pruritus; contact dermatitis; xerotic eczema; seborrhoeic dermatitis; dyshidrosis; discoid eczema; venous eczema; dermatitis herpetiformus; neurodermatitis; autoimmune diseases; autoeczematization; and the like. Skin inflammation may be inflammation accompanied by at least one symptom selected from a group consisting of rashes, eczema, hives, blisters, wheal, redness, skin edema (swelling), itching, dryness, crusting, flaking, blistering, cracking, oozing, and bleeding.

The skin inflammation may be skin inflammation caused by exposure of the skin to electromagnetic radiation. Examples of electromagnetic radiation include radio waves, microwaves, terahertz radiation, sunlight (e.g., infrared radiation, visible light, ultraviolet radiation), X-rays and gamma rays. Electromagnetic radiation includes infrared radiation, visible light, ultraviolet radiation, X-rays and gamma rays, and in one aspect, the electromagnetic radiation is ultraviolet radiation, X-rays and gamma rays. Thus, the medicament or cosmetics may be used, or for use, to treat sunburn.

Optionally the microbial oil/lipid, the lower alcohol ester composition, the free fatty acid composition, the microbial biomass, and the microorganism-containing culture according to the present disclosure may be administered with other therapeutic agents (such as corticosteroid) for any of the above medical uses.

It will be understood that a medicament for treatment of inflammatory/allergic disease is a medicament that is to suppress or relieve one or more symptoms when the symptom(s) is/are found or suspected to be due to inflammatory/allergic disease. On the other hand, a medicament for prevention of inflammatory/allergic disease is a medicament to suppress an occurrence of one or more symptoms, which may be predicted or anticipated due to inflammatory/allergic disease, by pre-administration. However, the terms "medicament for treatment" and "medicament for prevention" should be understood taking into account multiple or general aspects such as the timing of use and/or the symptom(s) to be treated/prevented on use, in line with clinical practice, and should not be restrictively applied.

EXAMPLES

Hereinafter, the present disclosure will be described in detail with reference to examples. However, the present disclosure is not at all limited to these examples. Unless specified otherwise, "%" is indicated on a mass basis.

Unless otherwise specified, in the following examples, "microbial cell" or "cell suspension" means an aggregation of microbial cells or cell suspensions, corresponding to the biomass in the present disclosure.

Example 1

(Acquisition of RD056399 Strain and Acquisition and Storage of Spore)

A RD056399 strain that was a related species of *Mortierella alpina* known as an ARA producing bacterium was acquired from a screening strain provided by National Institute of Technology and Evaluation Biotechnology Center. *M. alpina* was confirmed from results of the 18S rRNA gene sequence and the gene sequence of the Internal transcribed spacer (ITS) regions 1 and 2 of the RD056399 strain.

The RD056399 strain was cultured to static phase for 7 days at 25° C. at a slant in Czapek agar medium (adjusted to pH 6.0 and sterilized) provided in a test tube and shown in Table 1. After confirming hyphal growth, the test tube was stored in a refrigerator for from 30 to 90 days to promote spores formation. Sterilized water was added to the test tube and the mixture was well agitated to prepare a spore suspension. The spore suspension was appropriately diluted and coated onto a potato dextrose agar medium (adjusted to pH 6.3 and sterilized) (referred to hereinafter as the PDA medium) shown in Table 2, to carry out static culturing for 3 days at 25° C. The number of colonies formed on the PDA medium was counted, and the number of spores in the spore suspension was calculated, giving a result of $1 \times 10^6$ spores/mL. Next, the spore suspension was diluted 100-fold with sterilized water. Then, three components including the spore suspension diluted 100-fold, glycerin, and water were mixed in the following proportion: spore suspension diluted 100-fold:glycerin:water=1:1:8 (by volume) (the water and glycerin were premixed and sterilized). A 1 ml portion of the mixture was placed in a 1.2 ml volume sterilized cryogenic vial and cryopreserved in an ultra-low temperature freezer at −80° C. (referred to hereinafter as the cryopreserved cell suspension). For use of the RD056399 strain in culture, the cryopreserved cell suspension was rapidly thawed in a 25° C. incubator and inoculated to the culture.

TABLE 1

| Czapek agar medium | |
| --- | --- |
| Difco ™ Czapek-Dox Broth | 35 g |
| Purified agar powder | 15 g |
| Distilled water | Remainder 1 L |

TABLE 2

| PDA medium | |
| --- | --- |
| Difco ™ Potato Dextrose Agar | 39 g |
| Distilled water | Remainder 1 L |

Example 2

(Mutation Treatment)

0.1 ml of the cryopreserved cell suspension of the RD056399 strain was coated onto the PDA medium. The PDA medium coated with the cryopreserved cell suspension was irradiated with ultraviolet radiation using a Handy UV lamp SUV-16 (available from AS ONE Corporation) so that a death ratio was 99% or greater to induce gene mutation. To achieve a death ratio of 99%, UV was applied for from 5 to 10 seconds while a distance between the PDA medium and the SUV-16 was 14 cm.

After mutagenesis treatment, static culturing was carried out for from 2 to 5 days at 28° C. Each colony formed on the PDA medium was collected with a sterilized inoculating loop, streaked on a new PDA medium, and then cultured to static phase for 5 days at 28° C. This operation was repeated twice to isolate the strain subjected to each mutation treatment.

Example 3

(Screening of Mutation-Treated Strain and Acquisition of NSM243-16 Strain)

Each mutation-treated strain obtained in Example 2 was collected with a sterilized inoculating loop and was inoculated into a sterile 500 ml Erlenmeyer flask containing 100 ml of GY21 liquid culture medium (adjusted to pH 6.3 and sterilized) shown in Table 3. The flask was cultured at 28° C. with 100 rpm reciprocal shaking for 5 days. A thermostatic oven type shaking culture machine TXY-25R-2F (available from Takasaki Kagaku Kikai Co., Ltd) was used for the culture. Thereafter, 100 ml of each resulting cultured microbial cell suspension was passed through a polyester net having an average mesh size of 0.1 mm and dehydrated to recover a cultured microbial cell. The cultured microbial cell recovered was frozen at −80° C. and then subjected to a lyophilizer VA-140S (available from TAITEC Corporation) to obtain a freeze dried microbial cell of the mutation-treated strain.

A total lipid (microbial oil/lipid) was obtained from the obtained freeze dried microbial cell and then converted to a fatty acid methyl ester. Specifically, in accordance with the method (J. Biol. Chem. 226:497-509(1957)) by Folch et. al., the total lipid was extracted from the freeze dried microbial cell using chloroform:methanol (2:1, v/v). The total lipids thus obtained were methyl-esterified to obtain a fatty acid methyl ester (FAME). The FAME thus obtained was subjected to FAME analysis by gas chromatography. The conditions for the gas chromatography were set as follows.

- Column: DB-WAX 0.530 mm×30 m, membrane thickness: 1.00 μm (Agilent Technologies)
- Carrier gas conditions: helium 1.0 ml/min, separation ratio 100:1
- Column temperature conditions: 5 minutes at 140° C., temperature rise up to 240° C. at 4° C./min, 10 minutes at 240° C.
- Detection: FID
- Detector temperature: 260° C.
- Inlet temperature: 250° C.
- Injection volume: 1 μL As a result of the FAME analysis, a plurality of strains of mutant microbial cells (referred to hereinafter as DGLA producing strains) with the significantly reduced ARA concentration and the increased DGLA concentration in all fatty acids could be confirmed. In accordance with the method described in Example 1, the obtained DGLA producing strains were cultured to prepare a cryopreserved cell suspension. One of them was named the NSM243-16 strain and was deposited as accession number NITE BP-02778 by the National Institute of Technology and Evaluation (NITE) Patent Organism Depositary Center (#122, 2-5-8, Kazusakamatari, Kisarazu-shi, Chiba, Japan) on Sep. 11, 2018.

TABLE 3

| GY21 liquid culture medium | |
| --- | --- |
| Yeast extract (TASTONE 154) | 10 g |
| Glucose | 20 g |
| Distilled water | Remainder 1 L |

Example 4

(Analysis of DELTA-5 DESATURASE Gene)

Whole genomic DNA was extracted from each of microbial cells of the RD0596399 strain and the NSM243-16 strain cultured by the method described in Example 3 using DNeasy UltraClean Microbial Kit (manufactured by Qiagen). In accordance with the report (J. Biochem. Bioengineer. 99,296 (2005)) by Abe et. al., the DELTA-5 DESATURASE (referred to hereinafter as D5DS) gene was amplified by a PCR method using the obtained genomic DNA as a template. A base sequence of the PCR product obtained was determined by a Sanger method to obtain SEQ ID NO: 1 (D5DS gene sequence of the RD0596399 strain) and SEQ ID NO: 2 (D5DS gene sequence of the NSM243-16 strain), furthermore, SEQ ID NO: 3 (D5DS amino acid sequence of the RD0596399 strain) and SEQ ID NO: 4 (D5DS amino acid sequence of the NSM243-16 strain) (Table 4). The base sequence shown in SEQ ID NO: 1 was searched by the BLAST algorithm (Pro. Natl. Acad. Sci. 90, 5873 (1993) (<http://www.ncbi.nlm.nih.gov>)) by Karlin and Altschul. As a result, SEQ ID NO: 1 showed an identity of 92% with the D5DS gene sequence (Accession No. AB188307) of the *M. alpina* 1S-4 strain.

Next, by sequence comparison between SEQ ID NO: 1 and SEQ ID NO: 2 shown in FIG. 1, occurrence of (i) five point mutations in SEQ ID NO: 2 and (ii) deletion of bases at positions from 2206 to 2234 of SEQ ID NO: 1 could be confirmed. By a spot mutation of the base at position 1764, replacement of tyrosine at position 310 of the D5DS enzyme amino acid sequence (SEQ ID NO: 3) with cysteine was confirmed. Point mutations of bases at the remaining four points were confirmed to be present in an intron of the D5DS gene. In addition, occurrence of a splicing error due to a base deletion at positions from 2206 to 2234 was confirmed. It was considered that the function of D5DS of the NSM243-16 strain was lost due to these mutations.

TABLE 4

| | |
|---|---|
| SEQ ID NO: 1<br>RD0596399 strain | ATGGGTACGGACAAAGGAAAAACCTTCACTGGTATGGTCCCGACTGCCAATTCTACTGACCTTCTGCGCGATCTCGCATTCTGGAGGATG<br>CGATTCGCTGTACCTTGGGTCTAACTGGTCTAACAGGCAAGAACTGGCGCGCCATAATGCCTCCGAGGACAGCCTTCTTTTGGCTGTCCGTGGCAAT<br>AAAACCGCCCCTTGGGTCTTCACACTTCGTCTTCAACAAAGTTATACCAAGCTGTGGCTCCCACAGTTCCGAGCTGGAACGGATACTCTCCTGCTCTACTGACCATTAC<br>TATTTTTGTCTTCAACAAAGTTATACCAAGCTGTGGCTCCCACAGTTCCGAGCTGGAACGGATACTCTCCTGCTCTGTGGTCGGACTTT<br>CACCATTCGCAACGTGTAGGTATACGATTCGTACAAAGTTCTGCACAAGTGTGAAACGGATACTCTCCTGCTCTGTGAGCTGGTCGGA<br>ATGTCACTCCGGTAAGTTCCACGTATTCGTATTAGCAATCGCAAATCCGGGATTCATGATACAACTTGATAGGTCTTTGAGATGTACCACGAGTT<br>AGGCCATAGTGCTAAAAATCATGAAGTACAATCTCTTTGTCCTCCCTCGGGATTCATGATACAACTTGATAGGTCTTTGAGATGTACCACGAGTT<br>TGGAGCTGCAGAGCGTATCATGAAGTCGAATGGGTCGCCGACACGCGTTAGGAAGTAGTCATTATCTTTGCGCTGACGAGCGCGT<br>CTAACGAGCATTTTTGCGACCATTGTTGCCGACATTAGGAAGTATATGTTGGCCGACATTGGTCTCGAATGGTTCTACCAAGTTCCCGAGACC<br>AACGGTGTTCCACAAGACCATCAAGGGCAGAGTTGAGGGATACTTTAAGGATCGGAACATGGGTTTACCGAGTTAGAACAGACCAGAGATC<br>CAAGTATGTGTCTGTGGAAGGCAGAGTTCTGCTGTCGACATTCTTGAACGGCTCGATATATAATCGCTCCGAGCCACGACCGCTGGACTTT<br>GGTGTGTTGCTATCATCATGGAGATTCTCCGGACGCCACGACCATCTTTGACCCCTCTGAGCCAAGTGTGACCTGTTCGGCATCAAGGGTCGAATCGGCAAAATATCGATGGAATGGATTCTGTGGAAATTCTGTTGTGCTATCTGTGTCTGAGCCCTCAAGTGTGACCTGTTCGCTGGCATGTTCAAGCGAATCCAACATATGCTCCGGCCATCAAG
CCTATACCAACACTGCTGGAGCCGATCTGTGTCACGATGGTGAAGAGCCCTCAAGTGTGACCTGTTCAACGTTCTAGCTGGCTAGCTGGATATGTCTGCATCAAG<br>CACATCAACCAGCACATGTTGTTCCTTTCCCGATGGCGGTTCAAGGTGCGAATCAACGGTGAAAGGCCTTCTTGTCTGCTGGTCTACTTTGTCAA<br>GACCAATGACGCCATTCGTCTCTGCCCCGTAATCTCCACTTCGCTCGCTCGTGATGTGCCTATGTTGGCGGCAATGGCCTCTTCTACTCGCTGACTTTC<br>CAAGCGAATCACCACGTTCGTGAAGGAAGTTCAGTGCCGTTGCACCTGATGCTGCCAGCGTTCCACATCAAGGAATCATCAAAAGGACTGGGCTGCCATCGAGTCAGTCGAGAC<br>CACCCAGGATTACCGCCCACGATTCTGCGATATCCGGACACATCAATCAAGGATCCTGGAGAGCACCTGGCCATCTCCCAGGTGACGACGTCTCCAAACCGTGT<br>TTTTTTTTTCTTTTTTTATTCTGAACAGGATACCTTTTGGCAAGCGTTTGCTTCACATTTGGAGCACTTGCCGTGTTCTTGGTCTCGCTTGA<br>TGCCTTCTTTTATTCTGAACAGGATACCTTTTGGCAAGCGTTTGCTTCACATTTGGAGCACTTGCCGTGTTCTTGGTCTCGCTTGA<br>GGAAGAATAG |
| SEQ ID NO: 2<br>NSM243-16 strain | ATGGGTACGGACAAAGGAAAAACCTTCACTGGTATGGTCCCGACTGCCAATTCTACTGACCTTCTGCGCGATCTCGCATTCTGGAGGATG<br>CGATTCGCTGTACCTTGGGTCTAACTGGTCTAACAGGCAAGAACTGGCGCGCCATAATGCCTCCGAGGACAGCCTTCTTTTGGCTGACCGTGGCAAT<br>AAAACCGCCCCTTGGGTCTTCACACTTCGTCTTCAACAAAGTTATACCAAGCTGTGGCTCCCACAGTTCCGAGCTGGAACGGATACTCTCCTGCTCTGGTGACCCTT<br>TATTTTTGTCTTCAACAAAGTTATACCAAGCTGTGGCTCCCACAGTTCCGAGCTGGAACGGATACTCTCCTGCTCTGCTGACCATTAC<br>CACCATTCGCAACGTGTAGGTATACGATTCGTACAAAGTTCTGCACAAGTGTGAAACGGATACTCTCCTGCTCTGTGAGCTGGTCGGA<br>ATGTCACTCCGGTAAGTTCCACGTATTCGTATTAGCAATCGCAAATCCGGGATTCATGATACAACTTGATAGGTCTTTGAGATGTACCACGACG<br>AGGCCATAGTGCTAAAAATCATGAAGTACAATCTCTTTGTCCTCCCTCGGGATTCATGATACAACTTGATAGGTCTTTGAGATGTACCACGAGTT<br>TGGAGCTGCAGAGCGTATCATGAAGTCGAATGGGTCGCCGACACGCGCTATGCATGCATGAAGATAGTCATTACCTTTTGTCGAATGAGTTGCCCATCTCCCGAGCC<br>CTAACGAGCATTTTTGCCACAAGACCATCGTTGCGACATTGAGGAAGTATTATGTTGGCGACATGGAACATGGGAATCCCAAGGTAAAATTTGTTGTCCGATAG<br>CAAGTATGTGTCTGTGGAAGGCAGATTCTGCTGTCGACATCTTTGATCGCCTCTTATTAACCGGCTCGATATCCGTTAAGACAGACCAGAGATC<br>TGGGGACGGTATGCTCTCCATCTTTGATCGCCTCTTATTAACCGGCTCGATATCCGTTAAGACAGACCAGAGATC<br>GGTGTGTTGCTATCATCATGGAGATTCTCCGGACGCCACGACCATTCTTGATCCGGACATGGCGCCTGAACCTGTCGTGTCGAACCTACATGGCTCA<br>ATATCCGATCCATTGGAGATTCTCCGGACGCCACGACCATCTTTGATCCGTTTACTTGGAATGTACTTGGATGTACTTCAGGTAAGACCCTGG<br>CCTATACCAACACTGCTGGAGCCGATCTGTGTCACGATGCTCAAGAGCCTCAAGTGTGACCTCTGAGCCTTGAATCAACCTCAAGTGTCACTTTGTCAA<br>CACATCAACCAGCACATGTTGTTCCTTTCCTATGGACTGCTCACACTTTACCTTGCTGACAAGTCAAGGTGCCGTTGCACTTCCCAAACATCAACCCAAGCAACATCAAGGATCAACATATGCTCGGCCATCATC<br>TCGTTCCATGCAGTGTCTGCCCCCATCCACCTGCCACCACTTTGCTGTTGCACAAGGAATGAATCATCAAAAGGACTGAATCATCAAAAGGACTGGGCTGCCATGCAGTCGAGAC<br>CACCCAGGATTACCGCCCACCAGTTCCTCGGATCAATCCAGCACCACCAGCATCACCGGCAACATCCAGCAGCTTGAACTAGCGGACTTC |

TABLE 4-continued

SEQ ID NO: 3
RD0596399 strain

CCCAGCATCACTACCCTGATATCCTGGCCATCATCAAGGACACCTGCAGCGAGTACAAGGTGCCATACCTCGTCAAGGTACGTTTCTTTT
TTTTTTTTTCTTTCTTTTATTTTCTGCTATATATTCCAAATGTCTCGTGTCATGTTGTGCCCAAGTCGTTGTGTATTAACAAAGGA
TACCTTTGGCAAGCGTTTGCTTCACATTGGAGCACTTGCGTGTCTTGGTCTCCGTCTCCAAGAAGAATAG

MGTDKGKTFTWQELAAHNTEDSLLLAIRGNVYDVTKFLSRHPGGTDTLLLGAGRDVTPVFEMYHEFGAAEAIMKKYYVGTLVSNELPIFPEP
TVFHKTIKGRVEGYFKDRNMDPKNRPEIWGRYALIFGSLIASYYAQLFVPFVVERTWLQVVFAIIMGFACAQVGLNPLHDASHFSVTHNPTV
WKILGATHDFFNGASYLVWMYQHMLGHHPYTNIAGADPDVSTSEPDVRRIKPNQKMFVNHINQHMFVPFLYGLLAFKVRIQDINILYFVKTN
DAIRVNPISTWHTAMFWGGKAFFVWYRLIVPMQYLPLSKVLLLFTVADMVSSYWLALTFQANHVVEEVQWPLPDENGIIQKDWAAMQVETTQ
DYAHDSHLWTSITGSLNYQAVHHLFPNVSQHHYPDILAIIKDTCSEYKVPYLVKDTFWQAFASHLEHLRVLGLRPKEE

SEQ ID NO: 4
NSM243-16 strain

MGTDKGKTFTWQELAAHNTEDSLLLAIRGNVYDVTKFLSRHPGGTDTLLLGAGRDVTPVFEMYHEFGAAEAIMKKYYVGTLVSNELPIFPEP
TVFHKTIKGRVEGYFKDRNMDPKNRPEIWGRYALIFGSLIASYYAQLFVPFVVERTWLQVVFAIIMGFACAQVGLNPLHDASHFSVTHNPTV
WKILGATHDFFNGASYLVWMYQHMLGHHPYTNIAGADPDVSTSEPDVRRIKPNQKMFVNHINQHMFVPFLYGLLAFKVRIQDINILYFVKTN
DAIRVNPISTWHTAMFWGGKAFFVWYRLIVPMQCLPLSKVLLLFTVADMVSSYWLALTFQANHVVEEVQWPLPDENGIIQKDWAAMQVETTQ
DYAHDSHLWTSITGSLNYQAVHHLFPNVSQHHYPDILAIIKDTCSEYKVPYLVK

Example 5

(Production 1 of Dihomo-γ-Linolenic Acid-Containing Microbial Oil/Lipid)

A 0.1 ml cryopreserved cell suspension of the NSM243-16 strain was inoculated into a sterile 500 ml Erlenmeyer flask containing 100 ml of GY21 liquid culture medium shown in Table 3. The flask was cultured at 28° C. with 100 rpm reciprocal shaking for 5 days. A thermostatic oven type shaking culture machine TXY-25R-2F (available from Takasaki Kagaku Kikai Co., Ltd) was used for the culture. The resulting cultured microbial cell suspension was used as a pre-cultured liquid inoculated into a fermentor.

2.5 L of liquid culture medium containing soybean powder (adjusted to pH 6.0 and sterilized) shown in Table 5 was placed in a fermentor having a capacity of 5 L, and 1% amount (v/v) of a pre-cultured liquid was inoculated.

Under the conditions of a culture temperature of from 26° C. to 35° C., a stirring speed of from 400 to 800 rpm, an air flow rate of from 1.25 to 3.50 L/min, an internal gauge pressure of 0.05 MPa, and no pH adjustment, culturing was carried out for 2 days. Subsequently, a 1 L feed solution shown in Table 6 was repeatedly added so as to give a glucose concentration of 6 wt. % or less in the culture medium. After the 1 L feed solution was completely added, culturing was further carried out until the glucose concentration in the culture medium was 1 g/L or less. During culturing, when the dissolved oxygen concentration in the culture medium was reduced to 10% or less (the dissolved oxygen concentration at the start of the culture was 100%), the stirring speed was increased as appropriate, using 800 rpm as the upper limit. Additionally and alternatively, during culturing, when the dissolved oxygen concentration in the culture medium was reduced to 10% or less (the dissolved oxygen concentration at the start of the culture was 100%), the air flow rate was increased as appropriate, taking 3.50 L/min as the upper limit. During culturing, when large amounts of foaming occurred, an anti-foaming agent (Adekanol LG-109) was added as appropriate. The glucose concentration in the culture medium was measured using glucose C-II-Test Wako (Wako Pure Chemical Industries Ltd).

After 26 days from the start of culture in the fermentor, 3.5 L of cultured microbial cell suspension in the fermentor was sterilized using an autoclave, and after heat dissipation, the cultured microbial cell suspension was passed through a polyester net having an average mesh size of 0.1 mm and dehydrated. The dehydrated microbial cell was washed twice with 2.5 L distilled water. Thereafter, the cultured microbial cell suspension was passed through a polyester net having an average mesh size of 0.1 mm and dehydrated to recover a cultured microbial cell. The cultured microbial cell recovered was dried at 105° C. for 2 hours or more to obtain a heat dried microbial cell.

In the same manner as in Example 3, the total lipid (microbial oil/lipid) was obtained from the obtained heat dried microbial cell and then converted to a fatty acid methyl ester. In the same manner as in Example 3, the FAME thus obtained was subjected to FAME analysis by gas chromatography.

The fatty acid composition (wL %) of each fatty acid obtained from the NSM243-16 strain is shown in Table 7. In the table, "Others" denotes the total concentration of other fatty acids. In addition, the composition ratio of each fatty acid calculated from the fatty acid composition is shown in Table 8.

For the concentration of each fatty acid in all fatty acids produced by the NSM243-16 strain, DGLA was 33.59 wt. %, ARA was 0.00 wt. %, C20:0 was 0.88 wt. %, C22:0 was 2.05 wt. %, and C24:0 was 426 wt. %. The weight ratio of C24:0 to DGLA was 117.9. The total weight ratio of C22:0 and C24:0 to DGLA was 1/5.3. In addition, the total weight ratio of C24:0, C22:0, and C20:0 to DGLA was 1/4.7.

TABLE 5

Culture medium containing soybean powder

| | |
|---|---|
| Defatted soybean powder (Soya flour FT-N) | 40 g |
| Glucose | 25 g |
| Potassium dihydrogenphosphate | 3.0 g |
| Magnesium chloride hexahydrate | 0.5 g |
| Calcium chloride dihydrate | 0.5 g |
| Distilled water | Remainder 1 L |

TABLE 6

Feed solution

| | |
|---|---|
| Glucose | 420 g |
| Distilled water | Remainder 1 L |

TABLE 7

| | |
|---|---|
| C14:0 | 0.81 |
| C15:0 | 0.78 |
| C16:0(Pam) | 18.15 |
| C17:0 | 0.97 |
| C18:0(Ste) | 9.61 |
| C18:1n-9(Ole) | 15.93 |
| C18:2n-6(LA) | 2.95 |
| C18:3n-6(GLA) | 5.64 |
| C20:0 | 0.88 |
| C20:3n-6(DGLA) | 33.59 |
| C20:4n-6(ARA) | 0.00 |
| C20:4n-3(ETA) | 1.26 |
| C22:0 | 2.05 |
| C24:0 | 4.26 |
| others | 3.13 |

TABLE 8

| | |
|---|---|
| C24:0/DGLA | 1/7.9 |
| (C22:0 + C24:0)/DGLA | 1/5.3 |
| (C20:0 + C22:0 + C24:0)/DGLA | 1/4.7 |

Example 6

(Production 2 of Dihomo-γ-Linolenic Acid-Containing Microbial Oil/Lipid)

A 0.1 ml cryopreserved cell suspension of the NSM243-16 strain was inoculated into a sterile 500 ml Erlenmeyer flask containing 100 ml of GY21 liquid culture medium shown in Table 3. The flask was cultured at 28° C. with 100 rpm reciprocal shaking for 5 days. A thermostatic oven type shaking culture machine TXY-25R-2F (available from Takasaki Kagaku Kikai Co., Ltd) was used for the culture. The resulting cultured microbial cell suspension was used as a pre-cultured liquid inoculated into a fermentor.

2.5 L of liquid culture medium containing soybean powder (adjusted to pH 6.0 and sterilized) shown in Table 5 was placed in a fermentor having a capacity of 5 L, and 1% amount (v/v) of a pre-cultured liquid was inoculated.

Under the conditions of a culture temperature of 26° C., a stirring speed from 400 to 800 rpm, an air flow rate from 1.25 to 3.50 L/min, an internal gauge pressure of 0.05 MPa, and no pH adjustment, culturing was carried out for 2 days. Subsequently, a 1 L feed solution shown in Table 6 was repeatedly added so as to give a glucose concentration of 6 wt. % or less in the culture medium. After the 1 L feed solution was completely added, culturing was further carried out until the glucose concentration in the culture medium was 1 g/L or less. During culturing, when the dissolved oxygen concentration in the culture medium was reduced to 10% or less (the dissolved oxygen concentration at the start of the culture was 100%), the stirring speed was increased as appropriate, taking 800 rpm as the upper limit. Additionally or alternatively, during culturing, when the dissolved oxygen concentration in the culture medium was reduced to 10% or less (the dissolved oxygen concentration at the start of the culture was 100%), the air flow rate was increased as appropriate, taking 3.50 L/min as the upper limit. During culturing, when large amounts of foaming occurred, an anti-foaming agent (Adeka nol LG-109) was added as appropriate. The glucose concentration in the culture medium was measured using glucose C-II-Test Wako (Wako Pure Chemical Industries Ltd).

After 20 days from the start of culture in the fermentor, 3.5 L of cultured microbial cell suspension in the fermentor was sterilized using an autoclave, and after heat dissipation, the cultured microbial cell suspension was passed through a polyester net having an average mesh size of 0.1 mm and dehydrated. The dehydrated microbial cell was washed twice with 2.5 L distilled water. Thereafter, the cultured microbial cell suspension was passed through a polyester net having an average mesh size of 0.1 mm and dehydrated to recover a cultured microbial cell. The cultured microbial cell recovered was dried at 105° C. for 2 hours or more to obtain a heat dried microbial cell.

In the same manner as in Example 3, the total lipid (microbial oil/lipid) was obtained from the obtained heat dried microbial cell and then converted to a fatty acid methyl ester. In the same manner as in Example 3, the FAME thus obtained was subjected to FAME analysis by gas chromatography.

The fatty acid composition (wL %) of each fatty acid obtained from the NSM243-16 strain is shown in Table 9. In the table, "Others" denotes the total concentration of other fatty acids. In addition, the composition ratio of each fatty acid calculated from the fatty acid composition is shown in Table 10.

For the concentration of each fatty acid in all fatty acids produced by the NSM243-16 strain, DGLA was 34.01 wt. %, ARA was 0.00 wt. %, C20:0 was 0.81 wt. %, C22:0 was 1.89 wt. %, and C24:0 was 4.34 wt. % The weight ratio of C24:0 to DGLA was 1/7.8. The total weight ratio of C22:0 and C24:0 to DGLA was 1/5.5. In addition, the total weight ratio of C24:0, C22:0, and C20:0 to DGLA was 1/4.8.

TABLE 9

| | |
|---|---|
| C14:0 | 0.89 |
| C15:0 | 0.83 |
| C16:0(Pam) | 19.28 |
| C17:0 | 1.06 |
| C18:0(Ste) | 9.39 |
| C18:1n-9(Ole) | 12.92 |
| C18:2n-6(LA) | 3.17 |
| C18:3n-6(GLA) | 5.55 |
| C20:0 | 0.81 |
| C20:3n-6(DGLA) | 34.01 |

TABLE 9-continued

| | |
|---|---|
| C20:4n-6(ARA) | 3.00 |
| C20:4n-3(ETA) | 2.93 |
| C22:0 | 1.89 |
| C24:0 | 4.34 |
| others | 2.92 |

TABLE 10

| | |
|---|---|
| C24:0/DGLA | 1/7.8 |
| (C22:0 + C24:0)/DGLA | 1/5.5 |
| (C20:0 + C22:0 + C24:0)/DGLA | 1/4.8 |

Example 7

(Production 3 of Dihomo-γ-Linolenic Acid-Containing Microbial Oil/Lipid)

A 0.1 ml cryopreserved cell suspension of the NSM243-16 strain was inoculated into a sterile 500 ml Erlenmeyer flask containing 100 ml of GY21 liquid culture medium shown in Table 3. The flask was cultured at 28° C. with 100 rpm reciprocal shaking for 5 days. A thermostatic oven type shaking culture machine TXY-25R-2F (available from Takasaki Kagaku Kikai Co., Ltd) was used for the culture. The resulting cultured microbial cell suspension was used as a pre-cultured liquid inoculated into a fermentor.

2.5 L of liquid culture medium containing soybean powder (adjusted to pH 6.0 and sterilized) shown in Table 5 was placed in a fermentor having a capacity of 5 L, and 1% amount (v/v) of a pre-cultured liquid was inoculated.

Under the conditions of a culture temperature of 26° C., a stirring speed from 400 to 800 rpm, an air flow rate from 1.25 to 3.50 L/min, an internal gauge pressure of 0.05 MPa, and no pH adjustment, culturing was carried out for 2 days. Subsequently, a 1 L feed solution shown in Table 6 was repeatedly added so as to give a glucose concentration of 6 wt. % or less in the culture medium. After the 1 L feed solution was completely added, culturing was further carried out until the glucose concentration in the culture medium was 1 g/L or less. During culturing, when the dissolved oxygen concentration in the culture medium was reduced to 10% or less (the dissolved oxygen concentration at the start of the culture was 100%), the stirring speed was increased as appropriate, taking 800 rpm as the upper limit. Additionally or alternatively, during culturing, when the dissolved oxygen concentration in the culture medium was reduced to 10% or less (the dissolved oxygen concentration at the start of the culture was 100%), the air flow rate was increased as appropriate, taking 3.50 L/min as the upper limit. At the start of the culture, in order to prevent foaming, 2.5 g of soybean oil and 1.0 g of Adeka nol LG-109 were added to the culture medium to start the culture. During culturing, when large amounts of foaming occurred, an anti-foaming agent (Adeka nol LG-109) was added as appropriate. The glucose concentration in the culture medium was measured using glucose C-II-Test Wako (Wako Pure Chemical Industries Ltd).

After 17 days from the start of culture in the fermentor, 3.5 L of cultured microbial cell suspension in the fermentor was sterilized using an autoclave, and after heat dissipation, the cultured microbial cell suspension was passed through a polyester net having an average mesh size of 0.1 mm and dehydrated. The dehydrated microbial cell was washed twice with 2.5 L distilled water. Thereafter, the cultured microbial cell suspension was passed through a polyester net having an average mesh size of 0.1 mm and dehydrated to recover a cultured microbial cell. The cultured microbial cell recovered was dried at 105° C. for 2 hours or more to obtain a heat dried microbial cell.

In the same manner as in Example 3, the total lipid (microbial oil/lipid) was obtained from the heat dried microbial cell and then converted to a fatty acid methyl ester. In the same manner as in Example 3, the FAME thus obtained was subjected to FAME analysis by gas chromatography.

The fatty acid composition (wt. %) of each fatty acid obtained from the NSM243-16 strain is shown in Table 11. In the table, "Others" denotes the total concentration of other fatty acids. In addition, the composition ratio of each fatty acid calculated from the fatty acid composition is shown in Table 12.

For the concentration of each fatty acid in all fatty acids produced by the NSM243-16 strain, DGLA was 31.27 wt. %, ARA was 0.00 wt. %, C20:0 was 0.77 wt. %, C22:0 was 1.92 wt. %, and C24:0 was 5.16 wt. %. The weight ratio of C24:0 to DGLA was 1/6.1. The total weight ratio of C22:0 and C24:0 to DGLA was 1/4.4. In addition, the total weight ratio of C24:0, C22:0, and C20:0 to DGLA was 1/4.0.

TABLE 11

| | |
|---|---|
| C14:0 | 0.86 |
| C15:0 | 0.85 |
| C16:0(Pam) | 19.03 |
| C17:0 | 1.07 |
| C18:0(Ste) | 8.63 |
| C18:1n-9(Ole) | 15.48 |
| C18:2n-6(LA) | 3.02 |
| C18:3n-6(GLA) | 5.42 |
| C20:0 | 0.77 |
| C20:3n-6(DGLA) | 31.27 |
| C20:4n-6(ARA) | 0.00 |
| C20:4n-3(ETA) | 3.39 |
| C22:0 | 1.92 |
| C24:0 | 5.16 |
| others | 3.14 |

TABLE 12

| | |
|---|---|
| C24:0/DGLA | 1/6.1 |
| (C22:0 + C24:0)/DGLA | 1/4.4 |
| (C20:0 + C22:0 + C24:0)/DGLA | 1/4.0 |

Comparative Example

A 0.1 ml cryopreserved cell suspension of a SAM1860 strain was inoculated into a sterile 500 ml Erlenmeyer flask containing 100 ml of GY21 liquid culture medium shown in Table 3. The flask was cultured at 28° C. with 100 rpm reciprocal shaking for 5 days. A thermostatic oven type shaking culture machine TXY-25R-2F (available from Takasaki Kagaku Kikai Co., Ltd) was used for the culture. The resulting cultured microbial cell suspension was used as a pre-cultured liquid inoculated into a fermentor.

2.5 L of liquid culture medium containing soybean powder (adjusted to pH 6.0 and sterilized) shown in Table 5 was placed in a fermentor having a capacity of 5 L, and 1% amount (v/v) of a pre-cultured liquid was inoculated.

Under the conditions of a culture temperature of 26° C., a stirring speed of from 400 to 800 rpm, an air flow rate of from 1.25 to 3.50 L/min, an internal gauge pressure of 0.05 MPa, and no pH adjustment, culturing was carried out for 2 days. Subsequently, a 1 L feed solution shown in Table 6 was repeatedly added so as to give a glucose concentration of 6 wt. % or less in the culture medium. After the 1 L feed solution was completely added, culturing was further carried out until the glucose concentration in the culture medium was 1 g/L or less. During culturing, when the dissolved oxygen concentration in the culture medium was reduced to 10% or less (the dissolved oxygen concentration at the start of the culture was 100%), the stirring speed was increased as appropriate, taking 800 rpm as the upper limit Additionally or alternatively, during culturing, when the dissolved oxygen concentration in the culture medium was reduced to 10% or less (the dissolved oxygen concentration at the start of the culture was 100%), the air flow rate was increased as appropriate, taking 3.50 L/min as the upper limit. During culturing, when large amounts of foaming occurred, an anti-foaming agent (Adeka nol LG-109) was added as appropriate. The glucose concentration in the culture medium was measured using glucose C-II-Test Wako (Wako Pure Chemical Industries Ltd).

After 16 days from the start of culture in the fermentor, 3.5 L of cultured microbial cell suspension in the fermentor was sterilized using an autoclave, and after heat dissipation, the cultured microbial cell suspension was passed through a polyester net having an average mesh size of 0.1 mm and dehydrated. The dehydrated microbial cell was washed twice with 2.5 L distilled water. Thereafter, the cultured microbial cell suspension was passed through a polyester net having an average mesh size of 0.1 mm and dehydrated to recover a cultured microbial cell. The cultured microbial cell recovered was dried at 105° C. for 2 hours or more to obtain a heat dried microbial cell.

In the same manner as in Example 3, the total lipid (microbial oil/lipid) was obtained from the obtained heat dried microbial cell and then converted to a fatty acid methyl ester. In the same manner as in Example 3, the FAME thus obtained was subjected to FAME analysis by gas chromatography.

The fatty acid composition (wL %) of each fatty acid obtained from the SAM1860 strain is shown in Table 13. In the table, "Others" denotes the total concentration of other fatty acids. In addition, the composition ratio of each fatty acid calculated from the fatty acid composition is shown in Table 14.

For the concentration of each fatty acid in all fatty acids produced by the SAM1860 strain, DGLA was 35.86 wt. %, ARA was 0.33 wt. %, C20:0 was 0.94 wt. %, C22:0 was 2.96 wt. %, and C24:0 was 8.94 wt. %. The weight ratio of C24:0 to DGLA was 1/4.0. The total weight ratio of C22:0 and C24:0 to DGLA was 1/3.0. In addition, the total weight ratio of C24:0, C22:0, and C20:0 to DGLA was 1/2.8.

TABLE 13

| | |
|---|---|
| C14:0 | 0.48 |
| C15:0 | 0.38 |
| C16:0(Pam) | 15.38 |
| C17:0 | 0.50 |
| C18:0(Ste) | 8.50 |
| C18:1n-9(Ole) | 15.27 |
| C18:2n-6(LA) | 3.49 |
| C18:3n-6(GLA) | 3.89 |
| C20:0 | 0.94 |
| C20:3n-6(DGLA) | 35.86 |
| C20:4n-6(ARA) | 0.33 |
| C20:4n-3(ETA) | 0.23 |

TABLE 13-continued

| | |
|---|---|
| C22:0 | 2.96 |
| C24:0 | 8.94 |
| others | 2.86 |

TABLE 14

| | |
|---|---|
| C24:0/DGLA | 1/4.0 |
| (C22:0 + C24:0)/DGLA | 1/3.0 |
| (C20:0 + C22:0 + C24:0)/DGLA | 1/2.8 |

Accession Number
NITE BP-02778

The invention claimed is:

1. A microbial oil/lipid comprising dihomo-γ-linolenic acid and at least one of C24:0, C22:0, and C20:0 as constituent fatty acids, wherein the microbial oil/lipid comprises (i) dihomo-γ-linolenic acid in a content of greater than 30 wt. %, greater than 32 wt. %, or greater than 34 wt. %; (ii) C24:0, C22:0, and C20:0, in a total content of 12.0 wt. % or less, 11.0 wt. % or less, 10.0 wt. % or less, 9.0 wt. % or less, or 8.0 wt. % or less; and (iii) substantially no arachidonic acid or arachidonic acid in a content of 0.3 wt. % or less, 0.2 wt. % or less, 0.1 wt. % or less, 0.05 wt. % or less, 0.04 wt. % or less, 0.03 wt. % or less, or 0.01 wt. % or less, wherein the microbial oil/lipid comprises no Δ5 desaturase inhibitor.

2. The microbial oil/lipid according to claim 1, wherein as the constituent fatty acid of the oil, a content of C24:0 is 8.5 wt. % or less, 7.0 wt. % or less, 6.0 wt. % or less, or 5.5 wt. % or less.

3. The microbial oil/lipid according to claim 1, wherein as the constituent fatty acid of the oil, a total content of C24:0 and C22:0 is 11.0 wt. % or less, 10.0 wt. % or less, 9.0 wt. % or less, 8.0 wt. % or less, or 7.5 wt. % or less.

4. The microbial oil/lipid according to claim 1, wherein a compositional ratio of arachidonic acid to the dihomo-γ-linolenic acid as the constituent fatty acid of the oil is 1/120 or less, 1/180 or less, 1/360 or less, 1/1000 or less, 1/2350 or less, or 1/3000 or less in terms of weight ratio.

5. The microbial oil/lipid according to claim 4, wherein a compositional ratio of C24:0 to the dihomo-γ-linolenic acid as the constituent fatty acid of the oil is 1/4.1 or less, 1/5.0 or less, or 1/6.0 or less in terms of weight ratio.

6. The microbial oil/lipid according to claim 4, wherein a compositional ratio of a total of C24:0 and C22:0 to the dihomo-γ-linolenic acid as the constituent fatty acid of the oil is 1/3.1 or less, 1/4.0 or less, or 1/5.0 or less in terms of weight ratio.

7. The microbial oil/lipid according to claim 4, wherein a compositional ratio of a total of C24:0, C22:0, and C20:0 to the dihomo-γ-linolenic acid as the constituent fatty acid of the oil is 1/3.0 or less, 1/3.9 or less, or 1/4.8 or less in terms of weight ratio.

8. The microbial oil/lipid according to claim 1, wherein a compositional ratio of C24:0 to the dihomo-γ-linolenic acid as the constituent fatty acid of the oil is 1/4.1 or less, 1/5.0 or less, or 1/6.0 or less in terms of weight ratio.

9. The microbial oil/lipid according to claim 8, wherein a compositional ratio of a total of the C24:0 and C22:0 to the dihomo-γ-linolenic acid as the constituent fatty acid of the oil is 1/3.1 or less, 1/4.0 or less, or 1/5.0 or less in terms of weight ratio.

10. The microbial oil/lipid according to claim 8, wherein a compositional ratio of a total of the C24:0, C22:0, and C20:0 to the dihomo-γ-linolenic acid as the constituent fatty acid of the oil is 1/3.0 or less, 1/3.9 or less, or 1/4.8 or less in terms of weight ratio.

11. The microbial oil/lipid according to claim 1, wherein a compositional ratio of a total of C24:0 and C22:0 to the dihomo-γ-linolenic acid as the constituent fatty acid of the oil is 1/3.1 or less, 1/4.0 or less, or 1/5.0 or less in terms of weight ratio.

12. The microbial oil/lipid according to claim 11, wherein a compositional ratio of a total of the C24:0, the C22:0, and C20:0 to the dihomo-γ-linolenic acid as the constituent fatty acid of the oil is 1/3.0 or less, 1/3.9 or less, or 1/4.8 or less in terms of weight ratio.

13. The microbial oil/lipid according to claim 1, wherein a compositional ratio of a total of C24:0, C22:0, and C20:0 to the dihomo-γ-linolenic acid as the constituent fatty acid of the oil is 1/3.0 or less, 1/3.9 or less, or 1/4.8 or less in terms of weight ratio.

14. The microbial oil/lipid according claim 1, wherein the microbial oil/lipid is an oil derived from a filamentous fungus.

15. The microbial oil/lipid according to claim 14, wherein the filamentous fungus belongs to genus *Mortierella*.

16. A microbial oil/lipid comprising the microbial oil/lipid described in claim 1, wherein the microbial oil/lipid is a crude oil.

17. A pharmaceutical composition comprising the microbial oil/lipid described in claim 1.

18. An anti-allergic agent or an anti-inflammatory agent comprising the microbial oil/lipid described in claim 1.

19. A lower alcohol ester composition or a free fatty acid composition comprising dihomo-γ-linolenic acid, obtained or obtainable by a method comprising providing the microbial oil/lipid described in claim 1 to an ester exchange reaction or a hydrolysis reaction.

20. The composition according to claim 19, comprising the dihomo-γ-linolenic acid in a content of greater than 30 wt. %, greater than 32 wt. %, or greater than 34 wt. %.

21. The composition according to claim 19, comprising substantially no arachidonic acid or comprising arachidonic acid in a content of 0.3 wt. % or less, 0.2 wt. % or less, 0.1 wt. % or less, 0.05 wt. % or less, 0.04 wt. % or less, 0.03 wt. % or less, or 0.01 wt. % or less.

22. The composition according to claim 19, wherein a content of C24:0 is 8.5 wt. % or less, 7.0 wt. % or less, 6.0 wt. % or less, or 5.5 wt. % or less.

23. The composition according to claim 19, wherein a total content of C24:0 and C22:0 is 11.0 wt. % or less, 10.0 wt. % or less, 9.0 wt. % or less, 8.0 wt. % or less, or 7.5 wt. % or less.

24. The composition according to claim 19, wherein a total content of C24:0, C22:0, and C20:0 is 12.0 wt. % or less, 11.0 wt. % or less, 10.0 wt. % or less, 9.0 wt. % or less, or 8.0 wt. % or less.

25. The composition according to claim 19, wherein a compositional ratio of arachidonic acid to the dihomo-γ-linolenic acid as a constituent fatty acid of an oil is 1/120 or less, 1/180 or less, 1/360 or less, 1/1000 or less, 1/2350 or less, or 1/3000 or less in terms of weight ratio.

26. The composition according to claim 19, wherein a compositional ratio of C24:0 to the dihomo-γ-linolenic acid as a constituent fatty acid of an oil is 1/4.1 or less, 1/5.0 or less, or 1/6.0 or less in terms of weight ratio.

27. The composition according to claim 19, wherein a compositional ratio of a total of C24:0 and C22:0 to the dihomo-γ-linolenic acid as a constituent fatty acid of an oil is 1/3.1 or less, 1/4.0 or less, or 1/5.0 or less in terms of weight ratio.

28. The composition according to claim 19, wherein a compositional ratio of a total of C24:0, C22:0, and C20:0 to the dihomo-γ-linolenic acid as a constituent fatty acid of an oil is 1/3.0 or less, 1/3.9 or less, or 1/4.8 or less in terms of weight ratio.

29. A microbial biomass comprising the microbial oil/lipid described in claim 1.

30. A foodstuff, a supplement, a medicament, a cosmetic, or an animal feed comprising the microbial biomass described in claim 29.

31. A culture comprising the microbial biomass described in claim 29.

32. The culture according to claim 31, comprising the microbial oil/lipid in a content of 0.4 g/liter or greater.

33. A method of producing the microbial oil/lipid according to claim 1, the method comprising culturing, in a culture medium, a microorganism strain having a mutation in a Δ5 desaturase gene to produce the dihomo-γ-linolenic acid-containing microbial oil/lipid.

34. The method according to claim 33, wherein the microorganism strain has a gene mutation that results in an amino acid substitution of Y310C of SEQ ID NO: 3 of a Δ5 desaturase.

35. The method according to claim 33, wherein the microorganism strain has a base deletion at positions from 2206 to 2234 of SEQ ID NO: 1 of the Δ5 desaturase gene.

36. The method according to claim 33, wherein the microorganism strain belongs to genus *Mortierella*.

37. The method according to claim 33, wherein the microorganism strain is a microorganism deposited under accession number NITE BP-02778.

38. A microorganism having deposited under accession number NITE BP-02778.

* * * * *

SEQUENCE LISTING

<160> NUMBER OF SEQ ID NOS: 4

<210> SEQ ID NO 1
<211> LENGTH: 2310
<212> TYPE: DNA
<213> ORGANISM: Mortierella alpina

<400> SEQUENCE: 1

```
atgggtacgg acaaaggaaa aaccttcacc tggtatggtc ccgactgcca attctactga      60
ccttcctgcg cgatctcgca ttctggagga tgcgattcgc tgtaccttt tttttgtttt     120
tgttcctgaa agaaaaaaaa aaaggattca cgttcctgaa aaatgattcc aaacctgacc    180
caaaaaaacc gccccttggg tgtctaactg gctaacaggc aagaactggc ggcccataac    240
accgaggaca gccttctttt ggctatccgt ggcaatgtaa gcaaccttcg tcttcacact    300
tcccttgtc gctatcatat aatcgcctcc ggaccccaca gtctggtcga tactccgtgg    360
tcggacttta ttttttgtct tcaacaaagt tataccaagc tgtggctccc acaccaatta    420
tgccgagctg gatgcccacg gaccgtctac tgaccattac caccattcgc aacgtgtagg    480
tatacgatgt cacaaagttc ttgagccgcc atcctggtgg aacggatact ctcctgctcg    540
gagctggtcg agatgtcact ccggtaagtt ccacgtattc gtattagcaa tcgcaaatcc    600
gttaatggtc caatcagcgt gaatgatacg atgcacactg catgaggcga tagtgctaaa    660
aaatcatgca acttctttgt gcctccctcg ggattcatga taacttga taggtctttg      720
agatgtacca cgagtttgga gctgcagagg ctatcatgaa gtacgaatgg gtcgcgacac    780
gcgcttatgc atgaggtagt cacttatctt tgcggctgag gagcgcgtct aacgagcatt    840
ttttggacat tgtttgccga cattaggaag tattatgttg gcacactggt ctcgaatgag    900
ttgcccatct tcccggagcc aacggtgttc acaagacca tcaagggcag agttgaggga    960
tactttaagg atcggaacat ggatcccaag gtaaaatttg ttgtccggat agcaagtatg   1020
tgtctgtggg aaggtattct gctcgtctta ttaacctgga tccccacaat ggggttctac   1080
cgagtttaga acagaccaga gatctgggga cggtatgctc tcatctttgg atccttgatc   1140
gcctcttact acgcgcagct ctttgtaccg ttcgttgtcg aacgtacatg gctccaggtg   1200
gtgtttgcta tcatcatggg attcgcgtgc gctcaagtcg gactgaaccc tcttcacgat   1260
gcctcccact tttcaggtaa gaccctggat atccgatcca ttgcagtaac tgaaaaaaaa   1320
ggaacacgtc atgtgtctga tatgattgta cttggaatcg attctagtga cccacaaccc   1380
caccgtttgg aagattctcg gagccacgca cgacttttc aacggagcat cgtatcttgt   1440
gtggatgtac caacatatgc tcggccatca tccctatacc aacattgctg gagccgatcc   1500
cgatgtgtcg acctctgagc ccgatgttcg tcgtatcaag cccaaccaaa agtggttcgt   1560
caaccacatc aaccagcaca tgtttgttcc tttcctgtat ggactgctgg cgttcaaggt   1620
gcgaatccag gacatcaaca tcttgtactt tgtcaagacc aatgacgcca ttcgtgtcaa   1680
ccccatctcc acttggcaca ctgctatgtt ctggggcgga aaggccttct ttgtctggta   1740
ccgcttgatc gttcccatgc agtatctgcc cctgagcaag gtgttgctct tgttcacagt   1800
```

```
cgcagacatg gtctcttctt actggctggc gctgactttc caagcgaacc acgttgttga    1860
ggaagttcag tggccgttgc ctgacgagaa tggaatcatc caaaaggact gggctgccat    1920
gcaggtcgag accacccagg attacgccca cgattcgcac ctgtggacca gcatcacggg    1980
cagcttgaac taccaagccg ttcaccatct gttcccaaac gtgtcccagc atcactaccc    2040
tgatatcctg gccatcatca aggacacctg cagcgagtac aaggtgccat acctcgtcaa    2100
ggtacggttt cttttttttt ttttttcttt cttttttttt tctgctatat atattccaaa    2160
tgtctcgtgt catgttgttg cccaagtcgt tgtgtatta acaaatgatg cctctacttt    2220
ttttattctg aacaggatac cttttggcaa gcgtttgctt cacatttgga gcacttgcgt    2280
gttcttggtc tccgtcccaa ggaagaatag                                     2310

<210> SEQ ID NO 2
<211> LENGTH: 2281
<212> TYPE: DNA
<213> ORGANISM: Mortierella alpina

<400> SEQUENCE: 2
atgggtacgg acaaaggaaa aaccttcacc tggtatggtc ccgactgcca attctactga     60
ccttcctgcg cgatctcgca ttctggagga tgcgattcgc tgtaccttt tttttgtttt    120 tgttcctgaa agaaaaaaaa aaaggattca cgttcctgaa aaatgattcc aaacctgacc    180
caaaaaaacc gccccttggg tgtctaactg gctaacaggc aagaactggc ggcccataac    240
accgaggaca gccttctttt ggctatccgt ggcaatgtaa gcaaccttcg tcttcacact    300
tccctttgtc gctatcatat aatcgcctcc ggaccccaca gtctggtcga tactccgtgg    360
tcggacttta tttttttgtct tcaacaaagt tataccaagc tgtggctccc acaccaatta    420
tgccgagctg gatgcccacg gaccgtctac tgaccattac caccattcgc aacgtgtagg    480
tatacgatgt cacaaagttc ttgagccgcc atcctggtgg aacggatact ctcctgctcg    540
gagctggtcg agatgtcact ccggtaagtt ccacgtattc gtattagcaa tcgcaaatcc    600
gttaatggtc caatcagcgt gaatgatacg atgcacactg cacgaggcga tagtgctaaa    660
aaatcatgca acttctttgt gcctccctcg ggattcatga tacaacttga taggtctttg    720
agatgtacca cgagtttgga gctgcagagg ctatcatgaa gtacgaatgg gtcgcgacac    780
gcgcttatgc atgaggtagt cacttacctt tgcggctgag gagcgcgtct aacgagcatt    840
ttttggacat tgtttgccga cattaggaag tattatgttg gcacactggt ctcgaatgag    900
ttgcccatct tcccggagcc aacggtgttc cacaagacca tcaagggcag agttgaggga    960
tactttaagg atcggaacat ggatcccaag gtaaaatttg ttgtccggat agcaagtatg   1020
tgtctgtggg aaggtattct gctcgtctta ttaacctgga tccccacaat tgggttctac   1080
cgagtttaga acagaccaga gatctgggga cggtatgctc tcatcttttgg atccttgatc   1140 gcctcttact acgcgcagct ctttgtaccg ttcgttgtcg aacgtacatg ctccaggtg    1200 gtgtttgcta tcatcatggg attcgcgtgc gctcaagtcg gactgaaccc tcttcacgat   1260
gcctcccact tttcaggtaa gaccctggat atccgatcca ttgcagtaac tgcaaaaaaa   1320
ggaacacgtc atgtgtctga tatgattgta cttggaatca attctagtga cccacaaccc   1380
caccgtttgg aagattctcg gagccacgca cgactttttc aacggagcat cgtatcttgt   1440
gtggatgtac caacatatgc tcggccatca tccctatacc aacattgctg agccgatcc    1500 cgatgtgtcg acctctgagc ccgatgttcg tcgtatcaag cccaaccaaa agtggttcgt   1560
```

```
caaccacatc aaccagcaca tgtttgttcc tttcctgtat ggactgctgg cgttcaaggt    1620
gcgaatccag gacatcaaca tcttgtactt tgtcaagacc aatgacgcca ttcgtgtcaa    1680
ccccatctcc acttggcaca ctgctatgtt ctggggcgga aaggccttct tgtctggta    1740 ccgcttgatc gttcccatgc agtgtctgcc cctgagcaag gtgttgctct tgttcacagt    1800
cgcagacatg gtctcttctt actggctggc gctgactttc caagcgaacc acgttgttga    1860
ggaagttcag tggccgttgc ctgacgagaa tggaatcatc caaaaggact gggctgccat    1920
gcaggtcgag accacccagg attacgccca cgattcgcac ctgtggacca gcatcacggg    1980
cagcttgaac taccaagccg ttcaccatct gttcccaaac gtgtcccagc atcactaccc    2040
tgatatcctg gccatcatca aggacacctg cagcgagtac aaggtgccat acctcgtcaa    2100
ggtacggttt cttttttttt tttttctttt cttttatttt tctgctatat atattccaaa    2160
tgtctcgtgt catgttgttg cccaagtcgt ttgtgtatta acaaaggata ccttttggca    2220
agcgtttgct tcacatttgg agcacttgcg tgttcttggt ctccgtccca aggaagaata    2280
g                                                                   2281
```

<210> SEQ ID NO 3
<211> LENGTH: 446
<212> TYPE: PRT
<213> ORGANISM: Mortierella alpina

<400> SEQUENCE: 3

```
Met Gly Thr Asp Lys Gly Lys Thr Phe Thr Trp Gln Glu Leu Ala Ala
1               5                   10                  15

His Asn Thr Glu Asp Ser Leu Leu Ala Ile Arg Gly Asn Val Tyr
            20                  25                  30

Asp Val Thr Lys Phe Leu Ser Arg His Pro Gly Gly Thr Asp Thr Leu
        35                  40                  45

Leu Leu Gly Ala Gly Arg Asp Val Thr Pro Val Phe Glu Met Tyr His
    50                  55                  60

Glu Phe Gly Ala Ala Glu Ala Ile Met Lys Lys Tyr Tyr Val Gly Thr
65                  70                  75                  80

Leu Val Ser Asn Glu Leu Pro Ile Phe Pro Gln Pro Thr Val Phe His
                85                  90                  95

Lys Thr Ile Lys Gly Arg Val Glu Gly Tyr Phe Lys Asp Arg Asn Met
            100                 105                 110

Asp Pro Lys Asn Arg Pro Glu Ile Trp Gly Arg Tyr Ala Leu Ile Phe
        115                 120                 125

Gly Ser Leu Ile Ala Ser Tyr Tyr Ala Gln Leu Phe Val Pro Phe Val
    130                 135                 140

Val Glu Arg Thr Trp Leu Gln Val Val Phe Ala Ile Ile Met Gly Phe
145                 150                 155                 160

Ala Cys Ala Gln Val Gly Leu Asn Pro Leu His Asp Ala Ser His Phe
                165                 170                 175

Ser Val Thr His Asn Pro Thr Val Trp Lys Ile Leu Gly Ala Thr His
            180                 185                 190

Asp Phe Phe Asn Gly Ala Ser Tyr Leu Val Trp Met Tyr Gln His Met
        195                 200                 205

Leu Gly His His Pro Tyr Thr Asn Ile Ala Gly Ala Asp Pro Asp Val
    210                 215                 220

Ser Thr Ser Glu Pro Asp Val Arg Arg Ile Lys Pro Asn Gln Lys Trp
225                 230                 235                 240
```

```
Phe Val Asn His Ile Asn Gln His Met Phe Val Pro Phe Leu Tyr Gly
                245                 250                 255

Leu Leu Ala Phe Lys Val Arg Ile Gln Asp Ile Asn Ile Leu Tyr Phe
            260                 265                 270

Val Lys Thr Asn Asp Ala Ile Arg Val Asn Pro Ile Ser Thr Trp His
        275                 280                 285

Thr Ala Met Phe Trp Gly Gly Lys Ala Phe Val Trp Tyr Arg Leu
    290                 295                 300

Ile Val Pro Met Gln Tyr Leu Pro Leu Ser Lys Val Leu Leu Leu Phe
305                 310                 315                 320

Thr Val Ala Asp Met Val Ser Ser Tyr Trp Leu Ala Leu Thr Phe Gln
                325                 330                 335

Ala Asn His Val Val Glu Glu Val Gln Trp Pro Leu Pro Asp Glu Asn
            340                 345                 350

Gly Ile Ile Gln Lys Asp Trp Ala Ala Met Gln Val Glu Thr Thr Gln
        355                 360                 365

Asp Tyr Ala His Asp Ser His Leu Trp Thr Ser Ile Thr Gly Ser Leu
    370                 375                 380

Asn Tyr Gln Ala Val His His Leu Phe Pro Asn Val Ser Gln His His
385                 390                 395                 400

Tyr Pro Asp Ile Leu Ala Ile Ile Lys Asp Thr Cys Ser Glu Tyr Lys
                405                 410                 415

Val Pro Tyr Leu Val Lys Asp Thr Phe Trp Gln Ala Phe Ala Ser His
            420                 425                 430

Leu Glu His Leu Arg Val Leu Gly Leu Arg Pro Lys Glu Glu
        435                 440                 445

<210> SEQ ID NO 4
<211> LENGTH: 422
<212> TYPE: PRT
<213> ORGANISM: Mortierella alpina

<400> SEQUENCE: 4

Met Gly Thr Asp Lys Gly Lys Thr Phe Thr Trp Gln Glu Leu Ala Ala
1               5                   10                  15

His Asn Thr Glu Asp Ser Leu Leu Leu Ala Ile Arg Gly Asn Val Tyr
            20                  25                  30

Asp Val Thr Lys Phe Leu Ser Arg His Pro Gly Gly Thr Asp Thr Leu
        35                  40                  45

Leu Leu Gly Ala Gly Arg Asp Val Thr Pro Val Phe Glu Met Tyr His
    50                  55                  60

Glu Phe Gly Ala Ala Glu Ala Ile Met Lys Lys Tyr Tyr Val Gly Thr
65                  70                  75                  80

Leu Val Ser Asn Glu Leu Pro Ile Phe Pro Glu Pro Thr Val Phe His
                85                  90                  95

Lys Thr Ile Lys Gly Arg Val Glu Gly Tyr Phe Lys Asp Arg Asn Met
            100                 105                 110

Asp Pro Lys Asn Arg Pro Glu Ile Trp Gly Arg Tyr Ala Leu Ile Phe
        115                 120                 125

Gly Ser Leu Ile Ala Ser Tyr Tyr Ala Gln Leu Phe Val Pro Phe Val
    130                 135                 140

Val Glu Arg Thr Trp Leu Gln Val Val Phe Ala Ile Ile Met Gly Phe
145                 150                 155                 160

Ala Cys Ala Gln Val Gly Leu Asn Pro Leu His Asp Ala Ser His Phe
                165                 170                 175
```

-continued

```
Ser Val Thr His Asn Pro Thr Val Trp Lys Ile Leu Gly Ala Thr His
            180                 185                 190

Asp Phe Phe Asn Gly Ala Ser Tyr Leu Val Trp Met Tyr Gln His Met
        195                 200                 205

Leu Gly His His Pro Tyr Thr Asn Ile Ala Gly Ala Asp Pro Asp Val
    210                 215                 220

Ser Thr Ser Glu Pro Asp Val Arg Arg Ile Lys Pro Asn Gln Lys Trp
225                 230                 235                 240

Phe Val Asn His Ile Asn Gln His Met Phe Val Pro Phe Leu Tyr Gly
                245                 250                 255

Leu Leu Ala Phe Lys Val Arg Ile Gln Asp Ile Asn Ile Leu Tyr Phe
            260                 265                 270

Val Lys Thr Asn Asp Ala Ile Arg Val Asn Pro Ile Ser Thr Trp His
            275                 280                 285

Thr Ala Met Phe Trp Gly Gly Lys Ala Phe Phe Val Trp Tyr Arg Leu
        290                 295                 300

Ile Val Pro Met Gln Cys Leu Pro Leu Ser Lys Val Leu Leu Leu Phe
305                 310                 315                 320

Thr Val Ala Asp Met Val Ser Ser Tyr Trp Leu Ala Leu Thr Phe Gln
                325                 330                 335

Ala Asn His Val Val Glu Glu Val Gln Trp Pro Leu Pro Asp Glu Asn
            340                 345                 350

Gly Ile Ile Gln Lys Asp Trp Ala Ala Met Gln Val Glu Thr Thr Gln
            355                 360                 365

Asp Tyr Ala His Asp Ser His Leu Trp Thr Ser Ile Thr Gly Ser Leu
        370                 375                 380

Asn Tyr Gln Ala Val His His Leu Phe Pro Asn Val Ser Gln His His
385                 390                 395                 400

Tyr Pro Asp Ile Leu Ala Ile Ile Lys Asp Thr Cys Ser Glu Tyr Lys
                405                 410                 415

Val Pro Tyr Leu Val Lys
            420
```